United States Patent [19]

Pabon

[11] Patent Number: 5,251,290

[45] Date of Patent: Oct. 5, 1993

[54] MODELING METHOD FOR SORTING DEPENDENCIES AMONG GEOMETRIC ENTITIES

[75] Inventor: Jahir A. Pabon, Austin, Tex.

[73] Assignee: Schlumberger Technology Corporation, Austin, Tex.

[21] Appl. No.: 675,592

[22] Filed: Mar. 25, 1991

[51] Int. Cl.$^5$ .................. G06F 15/60; G06F 15/62
[52] U.S. Cl. .................................. 395/120; 395/118; 395/119; 395/140
[58] Field of Search ............... 395/143, 142, 141, 161, 395/118, 119, 120, 140; 340/747, 750

[56] References Cited

U.S. PATENT DOCUMENTS 5,043,929  8/1991  Kramer et al. ...................... 364/578

OTHER PUBLICATIONS

R. A. Light and D. C. Gossard, Modification of Geometric Models through Variational Geometry, *Computer-Aided Design*, 14(4), 1982.

J. C. H. Chung and M. D. Schussel, Technical Evaluation of Variational and Parametric Design, Proceedings of the 1990 ASME International Computers in Engineering Conference and Exposition, vol. 1, pp. 289-298, Boston, MA, Aug. 5-9, 1990.

J. C. H. Chung and M. D. Schussel, Comparison of Variational and Parametric Design, In *Autofact-89*, Detroit, MI, 1989.

R. J. Popplestone, A. P. Ambler and I. M. Bellos, Interpreter for a Language for Describing Assemblies, *Artificial Intelligence* 14(1):79-107, Aug. 1980.

*Primary Examiner*—Phu K. Nguyen
*Attorney, Agent, or Firm*—Charles D. Huston

[57] ABSTRACT

A system and method for geometric modeling particularly useful for conceptual design in a mechanical CAD system. Geometric modeling includes not only geometric information, but other engineering and design constraints as well. The present method solves this geometric constraint satisfaction problem using graph based solution techniques. Constraints are graph sources of dimensional, translational, and rotational degrees of freedom while the geometric entities in the model are graph sinks. The method generates an ordered dependency list of geometric entities by allocating degrees of freedom according to a geometric entity's ability to absorb them. The ordered dependency list is used as an execution sequence if a constraint is changed. If a constraint or geometric entity is added or deleted from the model, the ordered dependency list is recomputed. A modeler can thus conceptualize incremental changes in the model while satisfying the imposed constraints. Because the computational complexity is linearly related to the problem complexity, the graph based method is well suited to incrementally modeling complex geometric problems—particularly 3D geometry—in a robust fashion.

23 Claims, 42 Drawing Sheets

| geometric constraint | strength (d t r) |
|---|---|
| 2d-point-ground-constraint | (0 2 0) |
| 2d-points-distance-constraint | (0 1 0) |
| 2d-point-line-distance-constraint | (0 1 0) |
| 2d-line-horizontal-constraint | (0 0 1) |
| 2d-lines-angular-constraint | (0 0 1) |
| 2d-lines-distance-constraint | (0 1 1) |
| 2d-point-circle-coincident-constraint | (1 0 0) |
| 2d-line-circle-tangent-constraint | (1 0 0) |
| 2d-circles-tangent-constraint | (1 0 0) |
| 2d-circle-ground-radius-constraint | (1 0 0) |
| 3d-point-plane-coincident-constraint | (0 1 0) |
| 3d-point-line-coincident-constraint | (0 2 0) |
| 3d-planes-parallel-constraint | (0 0 2) |
| 3d-plane-sphere-tangent-constraint | (1 0 0) |
| 3d-plane-cylinder-tengent-constraint | (1 0 1) |

Figure 7

| geometric constraint | link1 | link2 |
|---|---|---|
| 2d-point-ground-constraint | point/(0 2 0) | |
| 2d-points-distance-constraint | point1/(0 1 0) | point2/(0 1 0) |
| 2d-point-line-distance-constraint | point/(0 1 0) | line/(0 1 0) |
| 2d-line-horizontal-constraint | line/(0 0 1) | |
| 2d-lines-angular-constraint | line1/(0 0 1) | line2/(0 0 1) |
| 2d-lines-distance-constraint | line1/(0 1 1) | line2/(0 1 1) |
| 2d-point-circle-coincident-constraint | point/(0 1 0) | circle/(1 0 0) |
| 2d-line-circle-tangent-constraint | line/(0 1 0) | circle/(1 0 0) |
| 2d-circles-tangent-constraint | circle1/(1 0 0) | circle2/(1 0 0) |
| 3d-point-plane-coincident-constraint | point/(0 1 0) | plane/(0 1 0) |
| 3d-point-line-coincident-constraint | point/(0 2 0) | line/(0 2 0) |
| 3d-planes-parallel-constraint | plane1/(0 0 2) | plane2/(0 0 2) |
| 3d-plane-sphere-tangent-constraint | plane/(0 1 0) | sphere/(1 0 0) |
| 3d-plane-cylinder-tengent-constraint | plane/(0 1 1) | cylinder/(1 0 1) |

Figure 8

| 2d-element | degrees of freedom (d t r) |
|---|---|
| 2d-point | (0 2 0) |
| 2d-line | (0 1 1) |
| 2d-circle | (1 2 0) |
| 3d-point | (0 3 0) |
| 3d-line | (0 2 2) |
| 3d-plane | (0 1 2) |
| 3d-sphere | (1 3 0) |
| 3d-cylinder | (1 2 2) |

MODELING METHOD FOR SORTING DEPENDENCIES AMONG GEOMETRIC ENTITIES

BACKGROUND OF THE INVENTION

1. Field of the Invention

The present invention relates to a system and method for geometric modeling where incremental changes to the model can be efficiently made and conceptualized. In particular, the method of the present invention provides a graph-based solution technique to present and manipulate a constraint driven geometric model and develops an ordered list of dependencies among geometric entities to serve as an execution sequence when changing the model.

2. Description of Problem the and Related Art

Geometric modeling of a system is important in many fields. An important subclass of geometric modeling problems are constraint driven problems where the positions, orientations, and dimensions of the geometric entities in the model should satisfy a set of constraints. Examples include: describing mechanical assemblies; constraint based sketching and design; geometric modeling for CAD; and kinematic analysis of robots and other mechanisms.

Current Computer-Aided Design (CAD) systems are generally limited to activities that occur at the end of the design cycle. However, some studies have shown that 75% of the cost of product development is determined before current CAD systems become useful, e.g. during the product "concept" stage. Therefore, there is a need for computer-aided design tools which are useful in making the critical decisions at the beginning of the design cycle—i.e. "conceptual design." Such tools would be very useful in the early design stages to manipulate the geometric entities in the model while satisfying the constraints imposed on the model. Additionally, such tools would be very useful for animation, tolerance determination, design sensitivity, and other activities later in the design cycle.

Current approaches for handling constrained geometric models have a number of disadvantages. Conventional approaches usually model the geometry and constraints with algebraic equations (usually non-linear equations) that relate the configuration variables of the different geometric entities according to the constraints. The equations are then solved either numerically or symbolically to yield the desired configuration for geometric entities. After developing this system of algebraic equations an iterative solution technique is usually used, e.g. Newton-Raphson, to evaluate the values of the variables representing the geometric entities.

Such iterative solution techniques have many drawbacks. The principle problem is that iterative techniques slow the solution time dramatically as a function of problem complexity. Iterative solution time is related to a cube function of the number of constraints—$O(c^3)$. Additionally, over constrained situations are common and require pre and post analysis to remove redundant constraints before solving to check them for consistency. Newton-Raphson iterative techniques can jump chaotically between different roots of the error function during solution of the algebraic equations. Further, under constrained situations require pseudoinverse techniques since the constraint matrix is not square.

I. E. Sutherland, *SKETCHPAD, a Manpk -Machine Graphical Communication System*, PhD thesis, Massachusetts Institute of Technology, Cambridge. Mass., 1963 and V. C. Lin. Variational geometry in computer-aided design. Master's thesis, Massachusetts Institute of Technology, May 1981 (incorporated for Background) illustrate current research approaches to convert geometric constraints into algebraic equations, generally nonlinear, and use iterative techniques, such as Newton-Raphson to evaluate equations.

H. O. Peitgen and P. H. Richter, *The Beauty of Fractals: Images of Complex Dynamical Systems*, Springer-Verlag, Berlin, 1986 and William H. Press, Brian P. Flannery, Saul A. Teukolsky, and William T. Vetterling, *Numerical Recipes: The Art of Scientific Computing*, Cambridge University Press, Cambridge, U.K. 1986 (incorporated for Background) describe iterative solution techniques (e.g. Newton-Raphson) for systems of non-linear algebraic equations, particularly ones that present constraints using error terms which vanish when the constraint is satisfied.

Another approach is to use symbolic solutions to rewrite the algebraic equations and isolate the configuration variables in the equations in a serial fashion. However, symbolic techniques are feasible and complete only for very small problems because the time required to find a solution is excessive.

B. Buchberger, G. E. Collins, and R. Loos, editors, *Computer Algebra; Symbolic and Algebraic Computation*, Springer-Verlag, Wein, second edition, 1983 (incorporated for Background) is illustrative of symbolic solutions which rewrite algebraic rules to isolate the configuration variables in the equations defining the geometric model.

G. L. Jr. Steele, *The Definition and Implementation of a Computer Programming Language Based on Constraints*, PhD thesis, Massachusetts Institute of Technology, Cambridge, Mass., 1980; A. Borning. *THINGLAB-A Constraint Oriented Simulation Laboratory* PhD thesis, Stanford University, Palo Alto, Calif., 1979; and J. Gosling. *Algebraic Constraints*, PhD thesis, Carnegie-Mellon University, Pittsburgh, Pa., 1983 (incorporated for Background) use constraint propagation schemes (mostly local propagation) to handle the constraint driven model problem. While these references hold some potential for providing nice interactive environments for simple parametric geometry problems, they do not scale well to complex models.

Some commercial products are available that are either limited in coverage or not very robust. TCM's product "$D^3$," is useful for drafting board geometry problems. "Pro Engineer" from Parametric Technology Corporation is useful for fully constrained geometric problems. "Premise," a product from Design View, uses a variational approach, which while versatile, is not robust.

SUMMARY OF THE INVENTION

The problems outlined above are generally solved by the system and method of the present invention for geometric modeling of a geometrically constrained problem. That is, the computer-aided modeling method of the present invention generates an ordered list of dependencies of the geometric entities in the model as an execution sequence when making changes to the model. The method is particularly advantageous in that computation time is linearly related to the number of geometric constraints which significantly reduces the time to visualize changes to the geometric model.

Broadly speaking, the computer-aided modeling method represents geometric entities and constraints as nodes in a directed graph, allocates degrees of freedom absorbed by each entity by determining a maximal flow through the graph, and generates an ordered dependency list of the geometric entities. The ordered dependency list is used as an execution sequence for modeling the behavior of the system if the model is changed, for example by changing the value of a constraint. If a geometric entity or constraint is added or deleted, the method is repeated to generate a new ordered dependency list.

Preferably the method generates the ordered dependency list by creating a second directed graph with the geometric entities represented as nodes and the constraints as links between the nodes. The links are directed based on the constraint dependency assigned from the maximal flow configuration through the first directed graph. From the second directed graph the strong components or "cycles" are determined and an ordered dependency list formulated. If a strong component utilizes a single geometric entity and the value of a constraint is changed, determining the new configuration of the affected geometric entities is made based on the ordered dependency list. If a strong component comprises two or more geometric entities, the method uses conventional algebraic equation problem solving techniques to determine possible configurations of the entities. Preferably, the changes to the geometric model are displayed to the user of the computer-added design system.

The geometric modeling system comprises a computer having a procedure for representing the geometric network as a directed graph of constraint, entity and sink nodes, as well as a determining procedure which operates to find a maximal flow through the directed graph. Advantageously, the determining procedure also computes an ordered dependency list of the geometric entities. The system includes a display that shows the current status of the geometric entities and shows changes to the network if a constraint or entity is changed. Preferably, the display is interactive to allow direct manipulation of the geometric entities or changes to the constraints. Preferably, the display indicates to the user when the network is under constrained—indicating a number of possible displays—and when a display is not possible because the model is over constrained.

BRIEF DESCRIPTION OF THE DRAWINGS

FIGS. 4A-E illustrate the method of the present invention applied to an under-constrained parametric triangle in which FIG. 4A is a schematic displaying the under constrained parametric triangle, FIG. 4B is a directed flow graph for the parametric triangle of FIG. 4A, FIG. 4C is a maximal flow graph solution for the graph of FIG. 4B, FIG. 4D is a schematic of a directed graph for determining the strong components of the parametric triangle of FIG. 4A, FIG. 4E illustrates displays in which the parametric triangle of FIG. 4A is changed;

FIGS. 5A-E illustrate the method of the present invention applied to a fully constrained parametric triangle in which FIG. 5A is a schematic displaying the fully constrained parametric triangle, FIG. 5B is a directed flow graph of the parametric triangle of FIG. 5A, FIG. 5C is a maximal flow graph solution for the graph of FIG. 5B;

FIG. 5D is a schematic of a directed graph for determining the strong components of the parametric triangle of FIG. 5A, FIG. 5E illustrates displays in which the parametric triangle of FIG. 5A is changed;

FIGS. 6A-C illustrate the method of the present invention applied to an over-constrained parametric triangle in which FIG. 6A is a schematic displaying the fully constrained parametric triangle, FIG. 6B is a directed flow graph for the parametric triangle of FIG. 6A.

FIG. 6C is a maximal flow graph solution for the graph of FIG. 6B;

FIG. 7 is a table which lists examples of geometric constraints and their corresponding strengths;

FIG. 8 is a table which depicts examples of the flow capacity for links connecting geometric constraints to the affected geometric elements;

FIG. 9 is a listing of examples of geometric elements and their corresponding degrees of freedom;

DESCRIPTION OF THE PREFERRED EMBODIMENTS

1. Graph Theory
2. Best Mode
   2.1 Overview
   2.2 Construction of Max-Flow Graph
   2.3 Graph Theory applied to the Geometry Problem
   2.4 Program Description
3. Examples of Operation

1. Relevant Graph Solution Techniques

This section presents two well known graph solution techniques and in the preferred embodiment - namely, a technique for finding the maximal flow in a directed graph, and a technique for finding the strongly-connected components (also called loops or cycles) in a directed graph. These techniques are generally known, see e.g., S. Even, *Graph Algorithms,* Computer Science Press, Rockville, Maryland, 1979 (incorporated for Background). This section may be skipped if one is familiar with these techniques.

1.1 The conventional maximal flow algorithm

Figure 12:
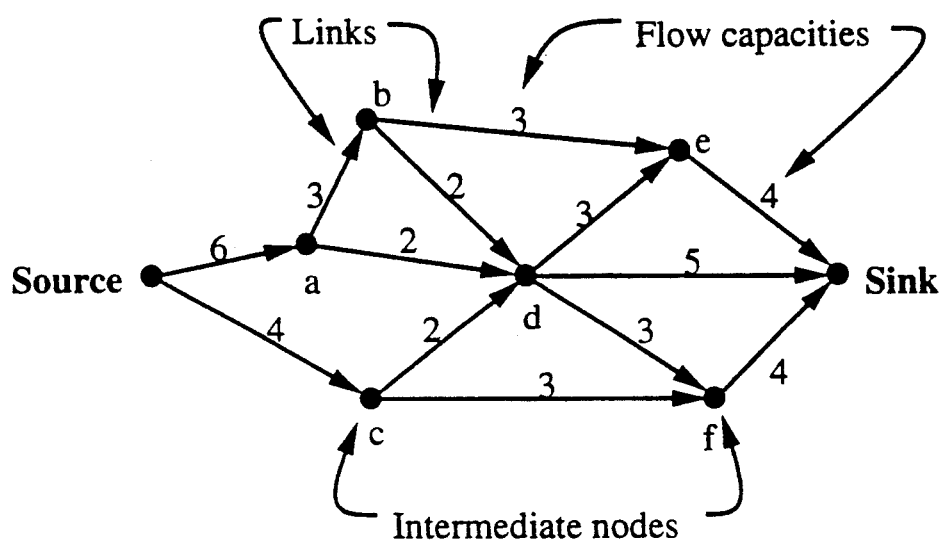
FIG. 12 illustrates conventional flow graph terminology.

Given a finite directed graph, $G=\{n,l\}$, composed by a list of nodes, $n=\{n_i\}$, and a list of directed links, $l=\{l_{ij}\}$, where $l_{ij}$ is the link directed from node $n_i$ to node $n_j$, and has a certain maximal "flow" capacity $c_{ij}$ (representing the maximal amount of some commodity that can flow through the link), the problem is to find the maximal flow that can be transferred from one of the graph nodes, called the source, to a second graph node, called the sink. FIG. 12 illustrates an example of such graphs. An extended treatment of the maximal flow problem is presented in E. L. Lawler, Combinatorial Optimization: Networks and Matroids, Holt, Rinehart, and Winston, New York, 1976.

Figure 13:
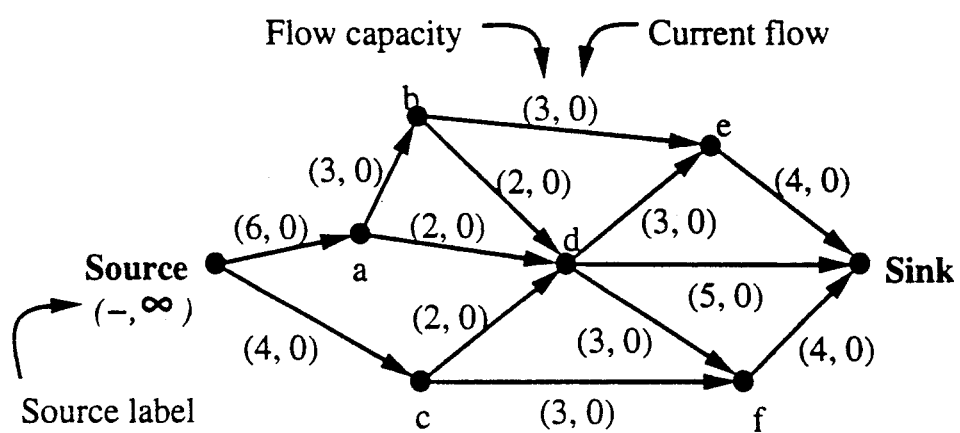
FIG. 13 illustrates an initial configuration of a flow graph.

(0) Start. Let $x=\{x_{ij}\}$ be an integral feasible flow, possibly the zero flow (see FIG. 13). Give the source node the permanent label $(,\infty)$.

(1) Labeling and Scanning.
  (1.1) If all labeled nodes have been scanned, go to Step (3).
  (1.2) Find a labeled but unscanned node $n_i$ and scan it as follows: For each link $l_{ij}$ (i.e., links coming out of node $n_i$), if $x_{ij}<n_j$ is unlabeled, give $n_j$ the label $(i^+,\delta_j)$, where $$\delta_j = min\{c_{ij}-x_{ij},\delta_i\}$$

For each link $l_{ki}$ (i.e., links going into node $n_i$), if $x_{ki}>0$ and $n_k$ is unlabeled, give $n_k$ the label $(i^-,\delta_k)$, where $$\delta_k = min\{z_{ki},\delta_i\}$$

(1.3) If the sink node has been labeled, go to Step (2); otherwise go to Step (1.1).

Figure 14:
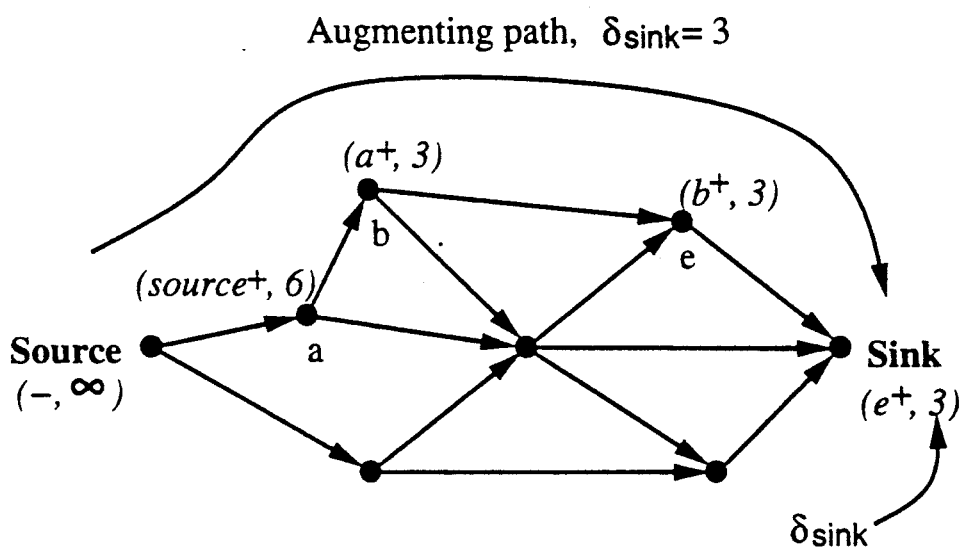
FIG. 14 shows an augmenting path for the graph configuration in FIG. 13.
Figure 15:
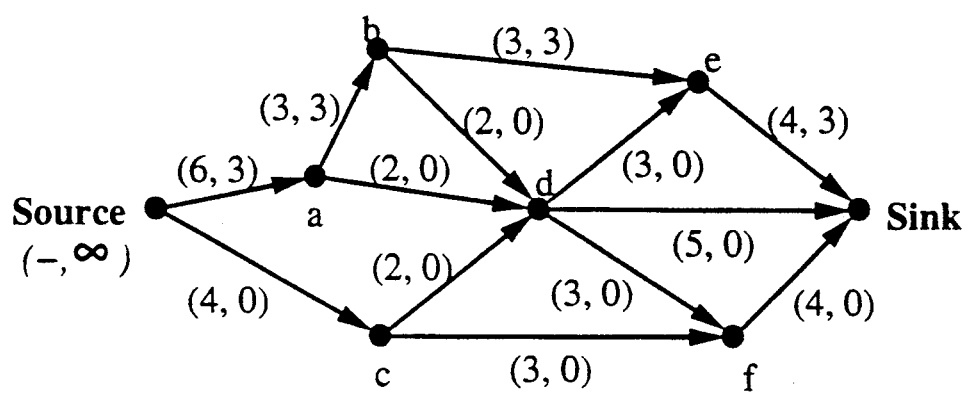
FIG. 15 presents an updated graph configuration of the graph of FIG. 13.

(2) Augmentation. Starting at the sink node, use the index labels to construct an augmenting path. (The label on sink indicates the second-to-last node in the path, the label on that node indicates the third-to-last node, and so on. FIG. 14 shows an augmenting path for the graph configuration in FIG. 13.) Augment the flow by increasing and decreasing the link flows by $\delta_{sink}$, as indicated by the superscripts on the index labels. (FIG. 15 presents the new flows for the problem example.) Erase all labels, except for the source. Go to step (1).

Figure 16:
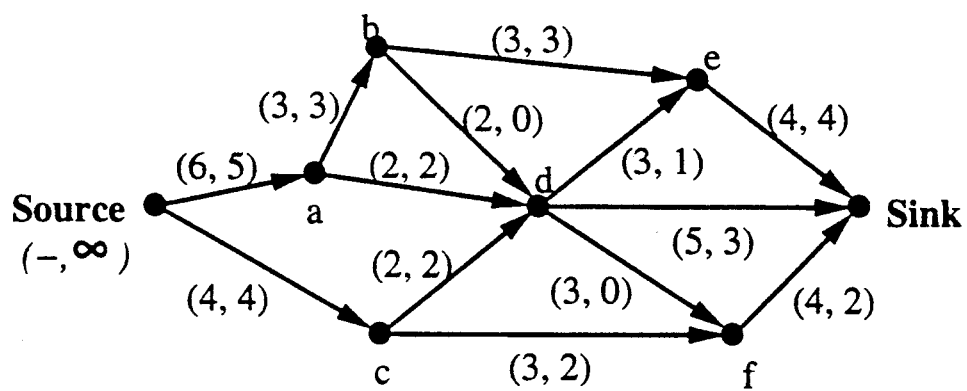
FIG. 16 illustrates a maximal flow configuration (compared to FIGS. 13 and 15)

(3) End. The existing flow is maximal. The computation is completed. (FIG. 16 presents a maximal flow configuration for the problem example).

The complexity of the maximum flow algorithm is O(fn), where f is the maximum flow and n is the number of links in the graph.

1.2 Maximal matching in bipartite graphs

One of the immediate applications of the max-flow algorithm is that of finding maximal matchings in bipartite graphs. The problem is stated as follows.

Figure 17:
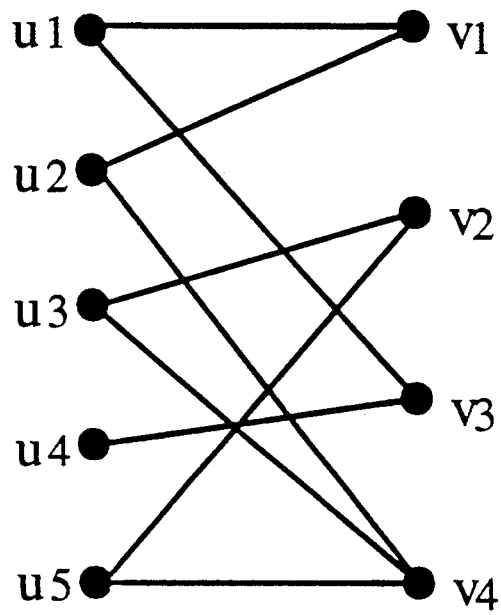
FIG. 17 illustrates an example of a bipartite graph.

Given a graph $G=\{[u,v],l\}$, where $u=\{u_i\}$, and $v=\{v_j\}$, are two sets of nodes, and $l=\{l_{ij}\}$, are links connecting nodes in u to nodes in v (FIG. 17 shows an example of such bipartite graphs), it is desired to find a maximal subset of links out of l with the condition that no two links share nodes.

Figure 18:
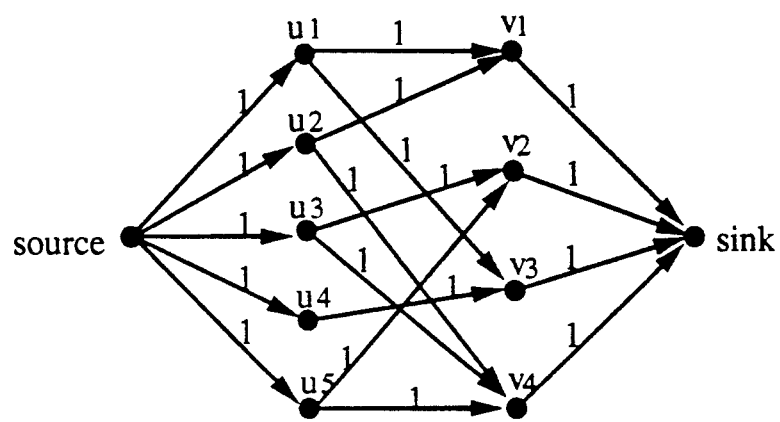
FIG. 18 illustrates the equivalent max-flow graph of the bipartite graph of FIG. 17.

A way to solve this problem is to convert it into maximal flow problem. This is done by adding two new nodes to the graph, a source, and a sink, creating directed links from the source to each of the nodes in u; creating directed links from each of the nodes in v to sink; assigning direction to the links in the original graph, so that all of these are directed towards nodes in v; and assigning a flow capacity of one unit of flow to all of the links in the resultant graph. FIG. 18 shows the equivalent max-flow graph for the bipartite graph in FIG. 17.

Figure 19:
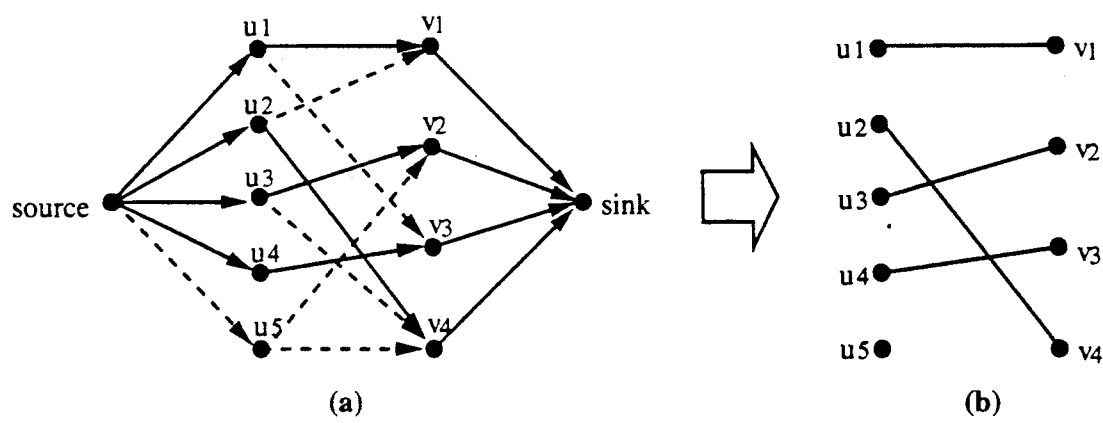
FIG. 19 depicts a solution to the matching problem where (a) is the maximal flow configuration and (b) is the corresponding matching.

The problem is now transformed into that of finding the maximal flow from source to sink. FIG. 19, part (a), shows a possible final configuration after applying the max-flow algorithm in Section 1.1 to the graph in FIG. 18. Links ending up carrying a unit of flow are drawn with solid lines, and dashed lines are used for links with no flow through them. FIG. 19, part (b) shows the corresponding maximal matching obtained by selecting the links in the original graph (FIG. 17) that carry a unit of flow through them.

Figure 20:
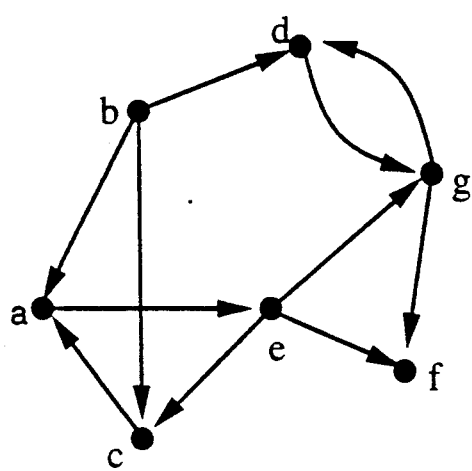
FIG. 20 is an example of a directed graph.

1.3 Algorithm for finding the strongly-connected components in a directed graph Given a finite directed graph, $G=\{n,l\}$, composed by a list of nodes, $n=\{n_i\}$, and a list of directed links, $l=\{l_{ij}\}$, where $l_{ij}$ is the link directed from node $n_i$ to node $n_j$ (see FIG. 20), a strongly-connected component (cycle, or loop) of G is a set of nodes, $C=\{n_k\}$, with the property that if $n_1$, $n_2$ are nodes of G, and $n_1$ is a member of C, and there is a directed path in G going from $n_1$ to $n_2$, as well as a directed path going from $n_2$ to $n_1$, then $n_2$ is also a member of C. AS an example, in FIG. 20, the set of nodes {a,c,e} form a cycle of G.

The following algorithm, taken from S. Even, Graph Algorithms, Computer Science Press, Rockville, Md., 1979 finds the strongly-connected components (cycles) in a directed graph. The complexity of the algorithm is linear in the number of links of the graph.

(1) Mark all the graph links "unused". For every $n_i$; in G let $k(n_i) \leftarrow 0$ and $f(n_i)$ be "undefined". Define an initially empty stack, S. Let $i \leftarrow 0$, and $n \leftarrow$ any node in G.

(2) $i \leftarrow i+1$, $k(n) \leftarrow i$, and put n on S.

(3) If there are no unused links coming out of n then go to Step (7).

(4) Choose an unused link 1
n →u.

Mark 1 "used". If k(u)=0 then f(u)←n, n←u, and go to Step (2).
(5) If k(u)>k(n) (1 is a forward link) go to Step (3). Otherwise (k(u)<k(n)), if u is not on S (u and n do not belong to the same component) go to step (3).
(6) (k(u)<k(n) and both nodes are in the same component) Let L(n)←min{L(n),k(u)} and go to Step (3).
(7) If L(n)=k(n) then delete all the nodes from S down to and including n; these nodes form a strong component (cycle) of the graph.
(8) If f(n) is defined then L(f(n))←min{L(f(n)),L(n)}, n←f(n) and go to Step (3).
(9) (f(n) is undefined) If there is a node u for which k(u)=0 then let n←u and go to Step (2).
(10) (All nodes have been scanned) Halt.

Figure 21:
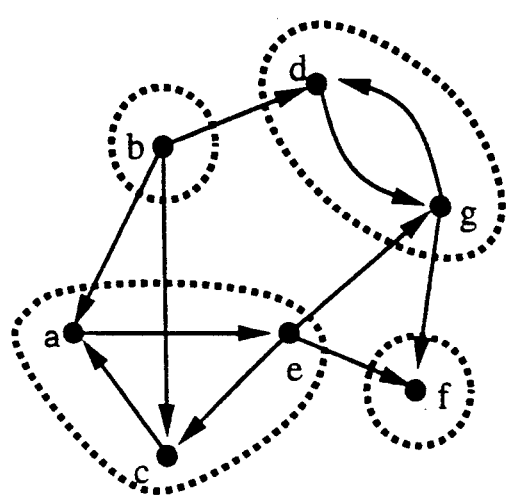
FIG. 21 illustrates the cycles for the directed graph of FIG. 20.

This algorithm has two important properties, First, the complexity is linear in the number of links of the graph. Second, the graph cycles are found in an order such that if $C_i$, and $C_j$ are two cycles, and $C_i$ was found (and taken out of the stack in Step (7) of the algorithm) before $C_j$, then it is guaranteed that there are no directed links going from nodes in $C_i$ to nodes in $C_j$. This ordering is very important in situations when the links directions represent node dependencies, in which case it can be said that nodes in $C_j$ do not depend on nodes in $C_i$. FIG. 21 shows the cycles for the graph in FIG. 20, and the order, right to left, in which these where found.

2. Best Mode 2.1 Overview

As previously discussed, constraint-driven geometric models are important problems in many domains. An important subclass of such problems are generally referred to as geometric constraint satisfaction problems and involve finding positions, orientations, and dimensions (sometimes referred to herein as "configuration") of geometric entities (or elements) that satisfy the imposed constraints. As previously discussed, conventional solutions to the geometric constraint satisfaction problem typically involve modeling the geometry and constraints with algebraic equations and solving this system of equations. A common generic solution technique presents the constraints as a sum of error terms and tries to find a "zero" of the sum of error terms. The process is necessarily iterative for non-linear equation sets and typically uses a technique such as Newton-Raphson iteration solution techniques.

The present invention is an entirely different approach to the solution of such geometric constraint problems and avoids algebraic reformulation of the geometric entities and constraints. Instead, the present method reasons directly about the degrees of freedom of the geometric entities that are possible.

Geometric entities have degrees of freedom which allow them to vary in location or size. For example, in 3 dimensional space a general fairly rigid body has three translational and three rotational degrees of freedom. A circle with a variable radius has three translational, two rotational, and one dimensional degree of freedom. In the present application the term "configuration" of a geometric entity is considered to be translational, rotational, and dimensional degrees of freedom variables used to parameterize the geometric entity. A more detailed discussion of degrees of freedom analysis is discussed in U.S. Pat. No. 5,043,929 commonly assigned to applicant (incorporated by reference).

In the present method the degrees of freedom are represented in a hierarchial fashion from "weakest" to "strongest": dimensional, translational, and rotational. That is, an action that restricts a particular class of degree of freedom may be used to satisfy a constraint involving that class of degree of freedom or a weaker one.

In most situations of interest, it has been found that if a geometric constraint can be satisfied using a translational degree of freedom, then it can be satisfied by using a rotational degree of freedom if it were available. Similarly, when a geometric constraint can be satisfied using a dimensional degree of freedom, then it can be satisfied by using a rotational or translational degree of freedom. Accordingly, a relative strength is assigned to each degree of freedom: rotational degrees of freedom are stronger than translational degrees of freedom, which in turn are stronger than dimensional degrees of freedom. Worded another way, rotational degrees of freedom can be used to satisfy rotational, translational, or dimensional constraints; translational degrees of freedom can be used to satisfy translational or dimensional constraints; while dimensional degrees of freedom can be used only to satisfy dimensional constraints.

When all the degrees of freedom in a geometric satisfaction problem have been allocated, an ordered dependency list among the geometric entities used in the model is generated. This ordered dependency list can then be used as an execution sequence to update the geometric entities to satisfy the imposed constraints when the model is changed. The ordered dependency list, used as an execution sequence, greatly reduces the computational time required when constructing and changing a geometric model. Therefore, a computer-aided geometric modeler can make changes to a model—such as changing the values of a constraint or adding or deleting geometric entities or constraints——and quickly visualize the results.

To generate the ordered dependency list among geometric entities, the present invention treats the geometric constraint problem as a graph flow problem, where the constraints on the model are sources of degrees of freedom and the geometric entities are sinks. The first graph solution technique is used to assign or match constraint dependencies to geometric entities (e.g. FIG. 4C). The first graph solution technique finds a maximal flow (there might be several solutions in under-constrained situations) in a directed graph to find the dimensional, translational, and rotational degrees of freedom absorbed by each geometric entity. The maximal flow solution distributes the degree of freedom classes according to each geometric entity's ability to absorb them.

After the constraint dependencies have been assigned to the geometric entities, a second directed graph (e.g. FIG. 4D) is created with the geometric entities represented as nodes in the graphs and the constraints represented as directed links between the nodes. A cycle finding graph solution technique is applied to the second directed graph to find the strongly connected components of the second graph. This list of strong components is an ordered dependency list that is used to determine which geometric entities in a model have to be updated when changes are made to the model. Possible changes to the model are such things as changes in dimensional values, addition or deletion of new constraints to the model, changes in the attributes of a geometric entity (e.g. slope of line, coordinative point, etc.), or addition or deletion of a geometric entity from the model.

Using the list of strong components as an ordered dependency list (i.e. execution sequence), allows the model to be updated or changed in a computationally efficient fashion (linerly related to model complexity). When the model is changed, the strong components in the ordered dependency list are updated sequentially in a given order (weakest to strongest). If a strong component comprises a single geometric element, then the method preferably uses constructive geometry solution techniques for updating. If a strong component comprises two or more geometric elements, the preferred embodiment uses a non-linear equation solver (e.g. Newton Raphson) to find appropriate values for the positions and orientations of the geometric elements in the strong component.

A particularly useful feature of the present method is feedback to the modeler. The geometric model is either over constrained, fully constrained, or under constrained. If the geometric model over constrained, a solution is not possible and the user is notified. In a fully constrained system the model is simply displayed although this situation is somewhat rare. In the under constrained situation a number of solutions are possible. The method presents a solution (display of geometric entities satisfying the constraints) to the modeler and notifies the modeler that the system is under constrained.

Figure 1:
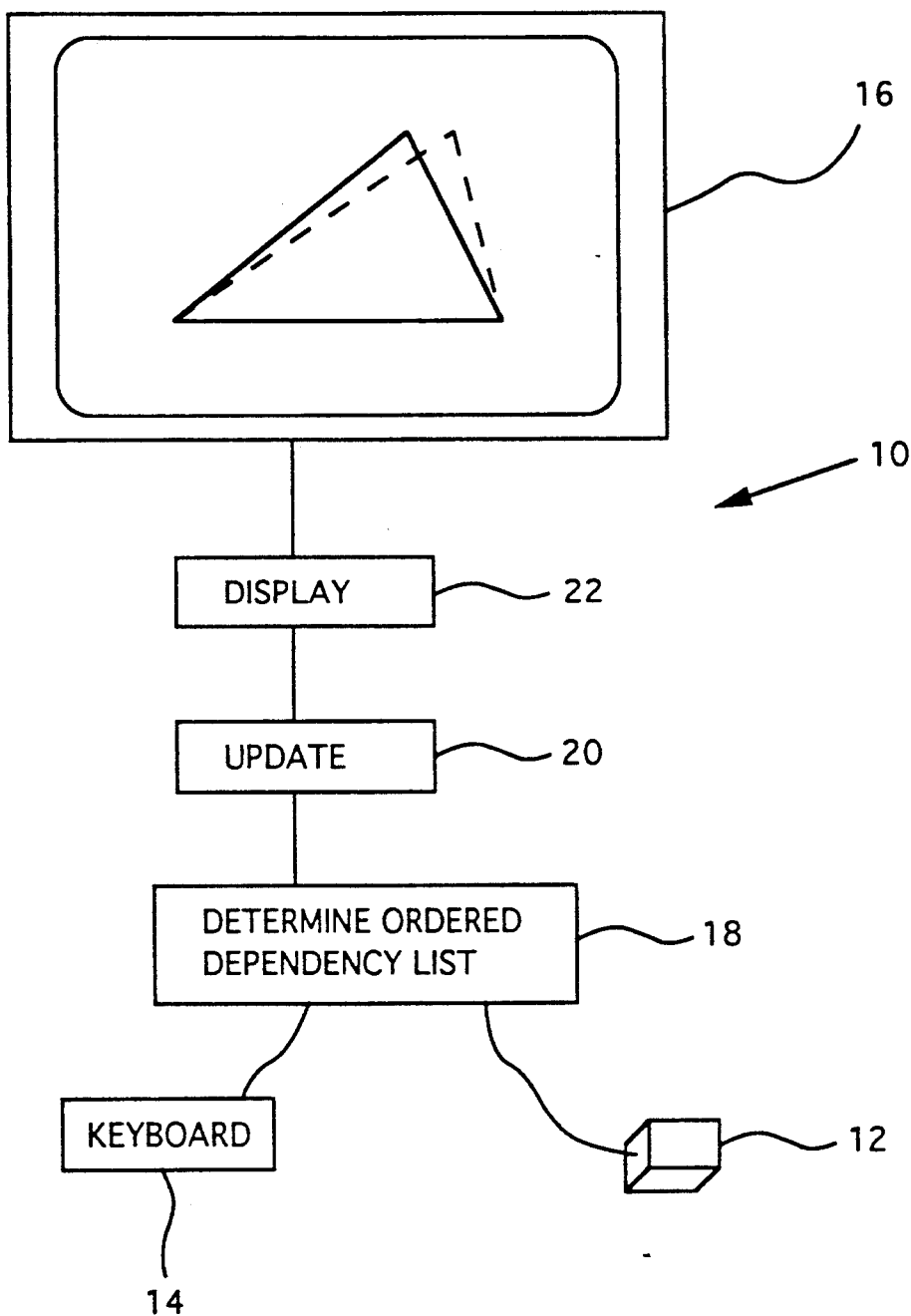
FIG. 1 is a schematic of the system in accordance with the present invention.

Turning to FIG. 1, the system 10 in accordance with the present invention is schematically illustrated. In development, a SPARCstation from Sun Microsystems running LISP compiler was used. System 10 includes input devices mouse 12, and keyboard 14, as well as a display 16. Broadly speaking, during modeling the system 10 utilizes procedures: determine ordered dependency list 18; update dependencies 20; and display current model 22.

2.2 Construction of a Max-Flow Graph for the Geometry Problem

The conventional graph theory presented in section 1 uses scalar values to denote flow capacities in the links. In the geometry modeling system 10, conventional graph theory must be adjusted to accommodate reasoning about degrees of freedom of the geometric entities. This section illustrates the preferred embodiment for applying conventional graph theory to degrees of freedom reasoning.

Figure 4A:
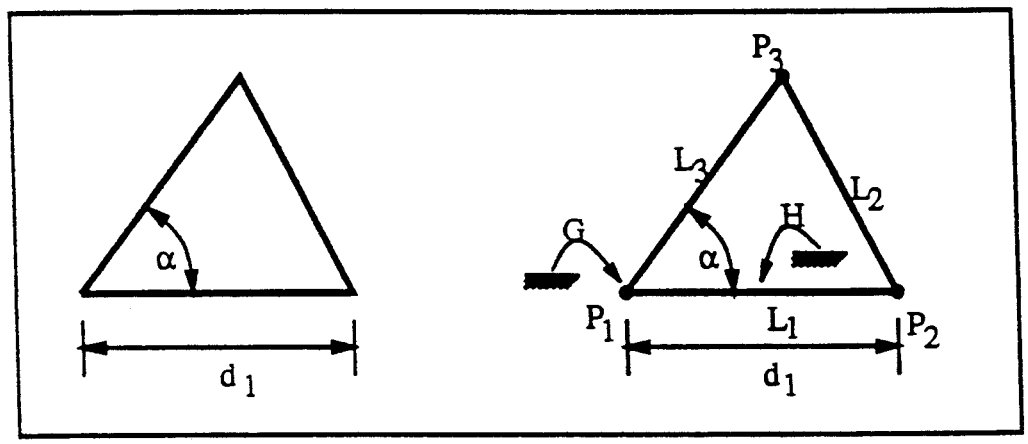
Figure 4B:
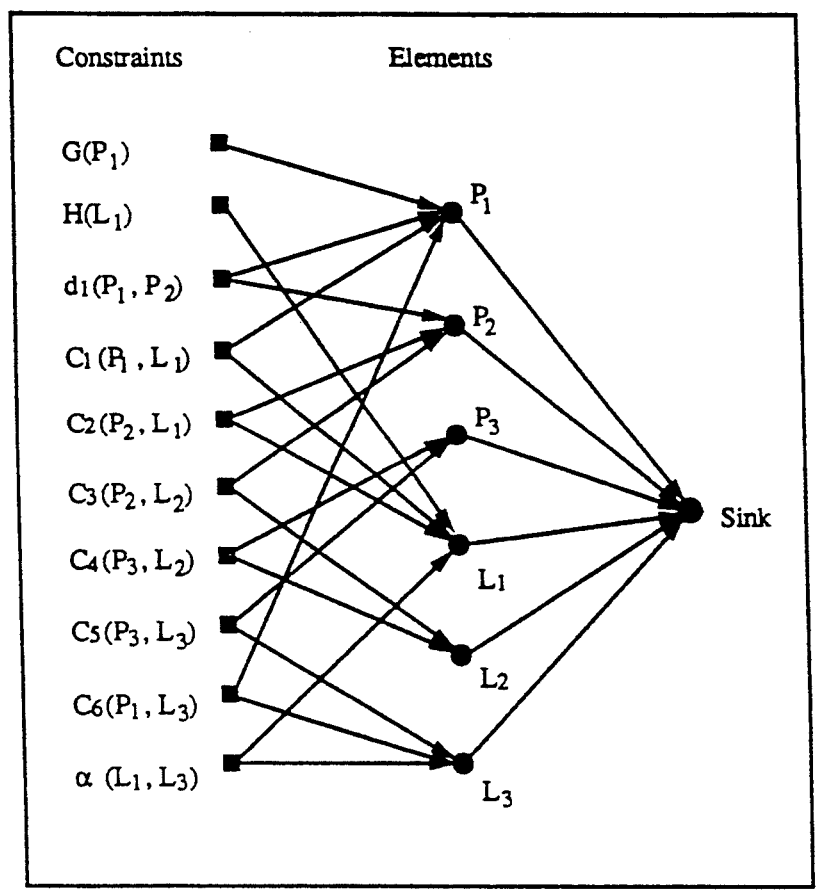
Figure 5A:
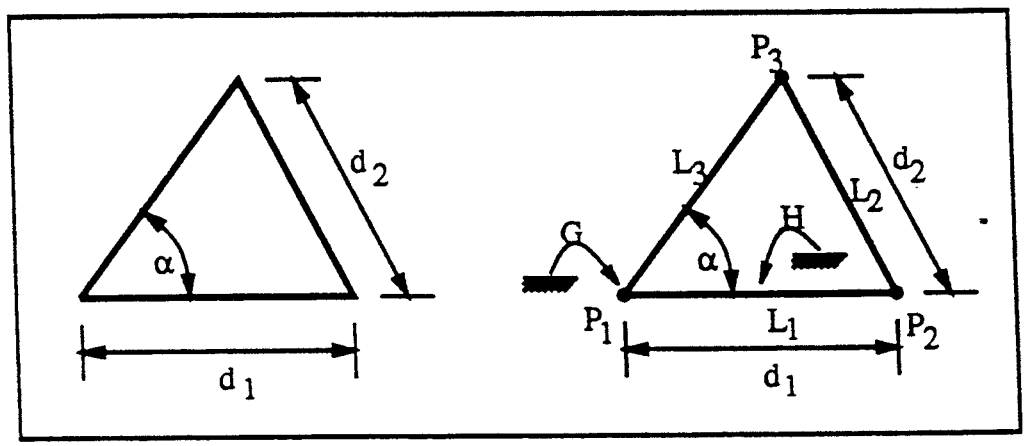
Figure 5B:
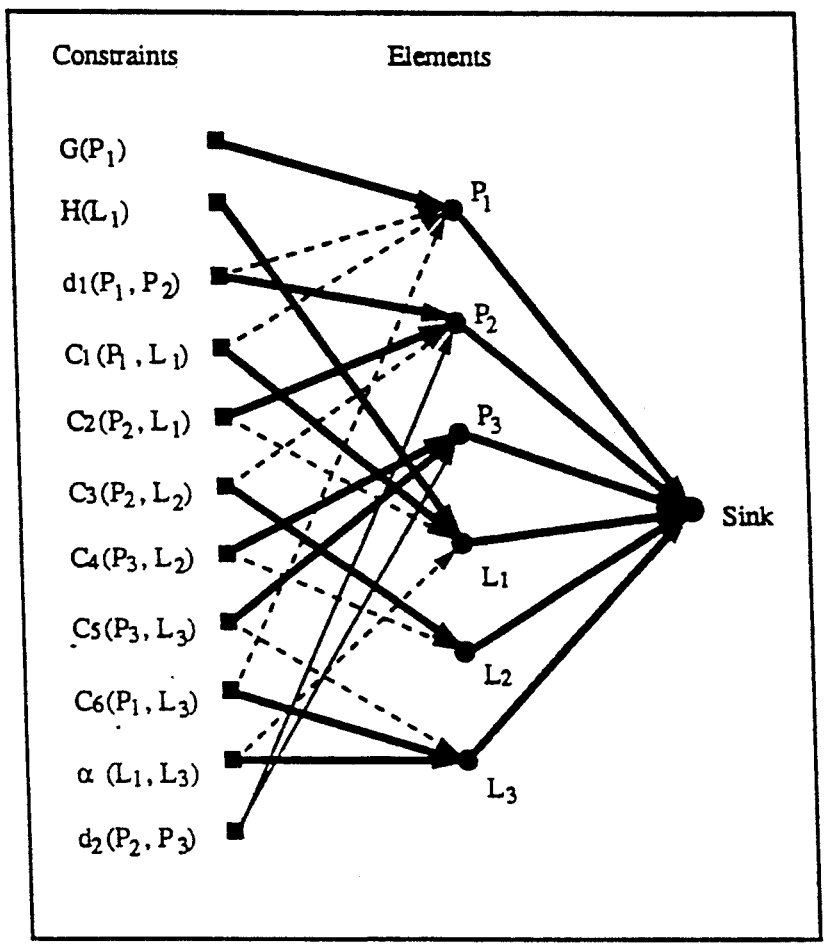
Figure 6A:
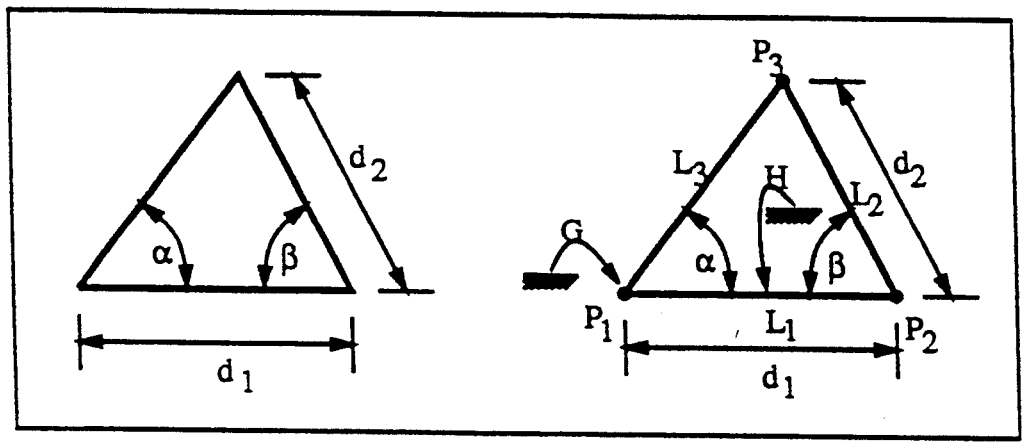
Figure 6B:
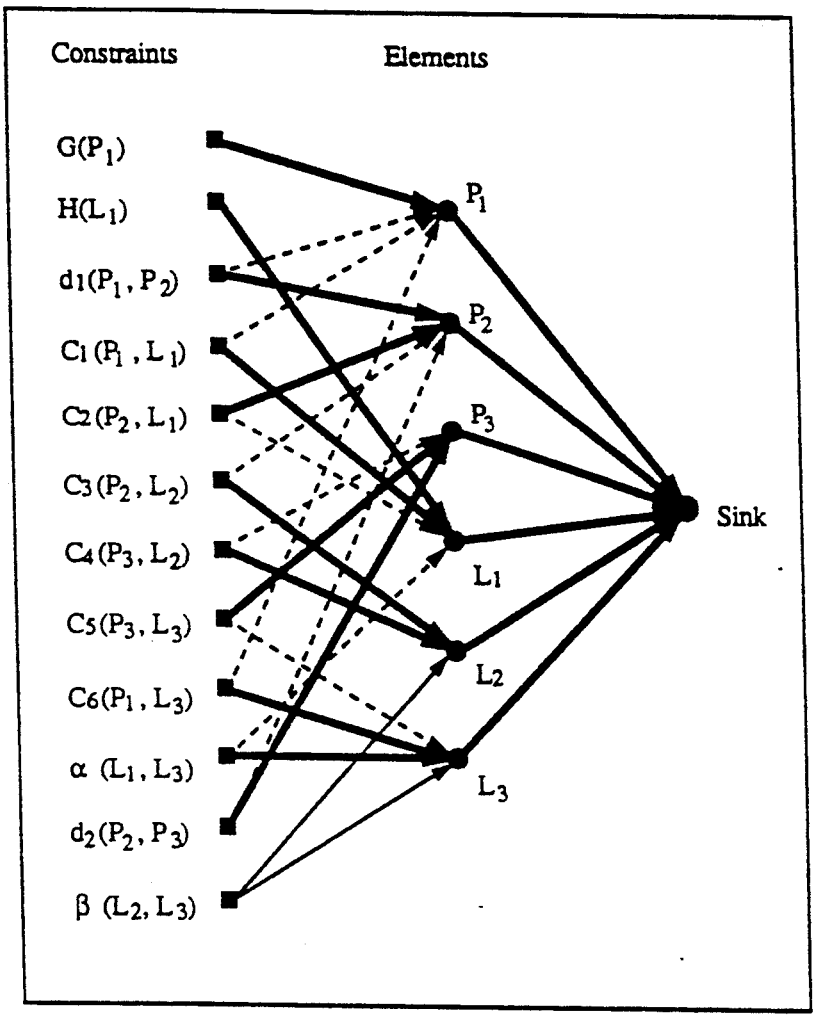

FIGS. 4A, 5A, and 6A illustrate examples of a parametric triangle in which a set of geometric elements, e, are constrained by a set of geometric constraints, c, acting between the geometric elements. System 10 builds a directed graph of three layers of nodes as illustrated in FIGS. 4B, 5B, and 6B. The nodes in the first layer represent the geometric constraints. The nodes in the second layer represent the geometric entities or elements, while the third layer comprises a single node called the sink.

Each constraint node is assigned a flow capacity equal to the constraint strength, i.e. a triplet of values corresponding to the number of rotational, translational, and dimensional degrees of freedom constrained by it. FIG. 7 lists some of the geometric constraints that are imposed among points, lines, and circles and their corresponding strengths with a triplet of values. In FIG. 7 the D, T, and R represent the number of dimensional, translational, and rotational degrees of freedom affected by the constraint.

Next, links are created between each constraint node and the entity nodes constrained. For example, in FIGS. 4A, B, distance $d_1$ is a constraint imposed between the two points $P_1$, $P_2$. As shown in FIG. 4B, the link is directed from constraint $d_1$ to the two entities affected — $P_1$, $P_2$. The links between the constraint and entity nodes are assigned a flow capacity equal to the number of degrees of freedom of the geometric entity affected by the constraint. The table in FIG. 8 is exemplary of flow capacities for link. For example, as shown in FIG. 8 the flow capacities for the links between constraint $d_1$ and entities $P_1$ and $P_2$ are both (0 1 0).

The links between the geometric entities and the sink are also assigned flow capacities according to the geometric entity involved. The table in FIG. 9 lists exemplary flow capacities for geometric elements. For example, in FIG. 4B the points $P_1$, $P_2$ are assigned the flow capacities (0 2 0) from FIG. 9.

Figure 4C:
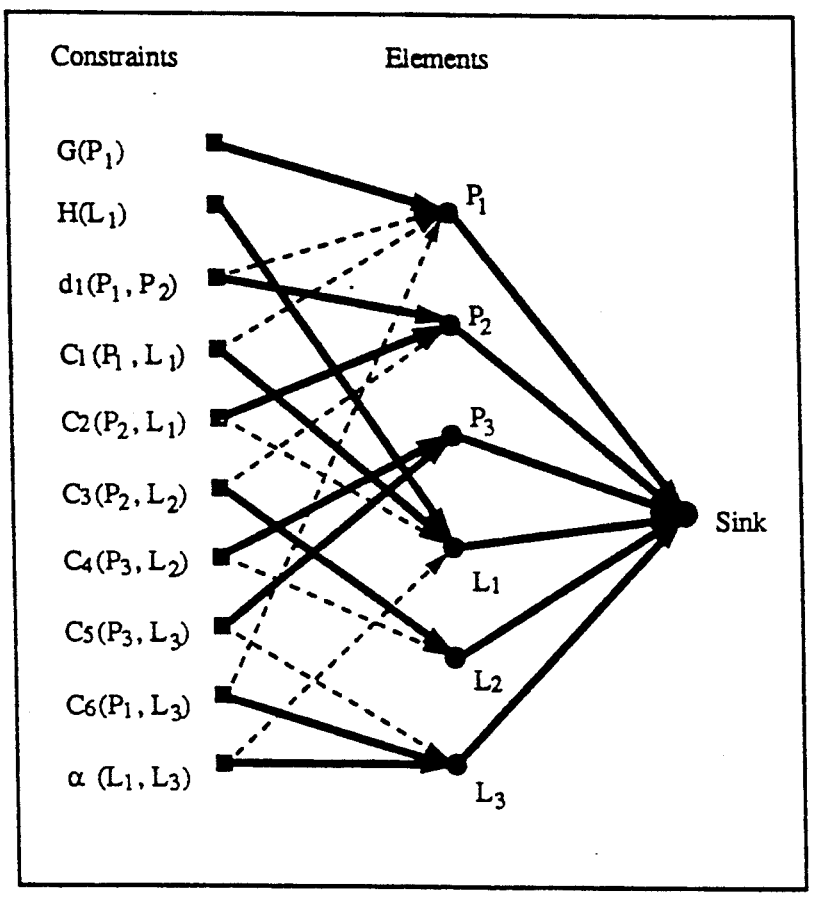

The problem of assigning dependencies between geometric constraints and geometric entities is now equivalent to obtaining the maximum flow that can be transferred from constraint nodes through the geometric entity nodes to the sink node (compare FIGS. 4B and 4C). The technique for solving a maximal flow (and hence to assigning dependencies) is described in sections 1, 2, 3, and 2.4.

Additionally, there are several important factors that differentiate the geometric maximum flow problem from the conventional graph flow theory of section 1. First there are multiple sources (in fact each constraint is a source) each one with a finite flow strength (or capacity). Second, the flow through the graph is a vector quantity with three scalar values. The scalar values represent the different types of degrees of freedom—rotational, translational, and dimensional. In the conventional max-flow problem, a flow is a single scalar value. Third, three scalar values representing the degrees of freedom are not dependent and not commutative.

In order to account for the particular features of the geometric problem, several modifications are tied to the conventional max-flow algorithm. For example, relative strength is assigned to each type of degree of freedom—i.e. rotational degrees of freedom are stronger than translational degrees of freedom, which in turn are stronger than dimensional degrees of freedom.

2.3 Graph theory applied to the geometry problem

Given a finite three-layered directed graph, $G=\{[c,e,sink],[l,t]\}$, where $C=\{c_i\}$, is the list of nodes representing geometric constraints, $e=\{e_i\}$, is the list of nodes representing geometric elements, $l=\{l_{ij}\}$, is the list of links connecting the constraints to the affected elements, and $t=\{t_{ij}\}$, is the list of links connecting the elements to sink. The graph G represents a geometric model (see e.g. FIGS. 5A and 5B).

When a new geometric element (i.e. entity) is added to the model proceed as follows:

(0) Create a node representing the element and add it to the set e (1) Create a link going from the new node to sink. Set the flow capacity (strength) of the link according to the table of FIG. 9. And set the current flow through the link to be the null flow, (0, 0, 0).

Figure 10A:
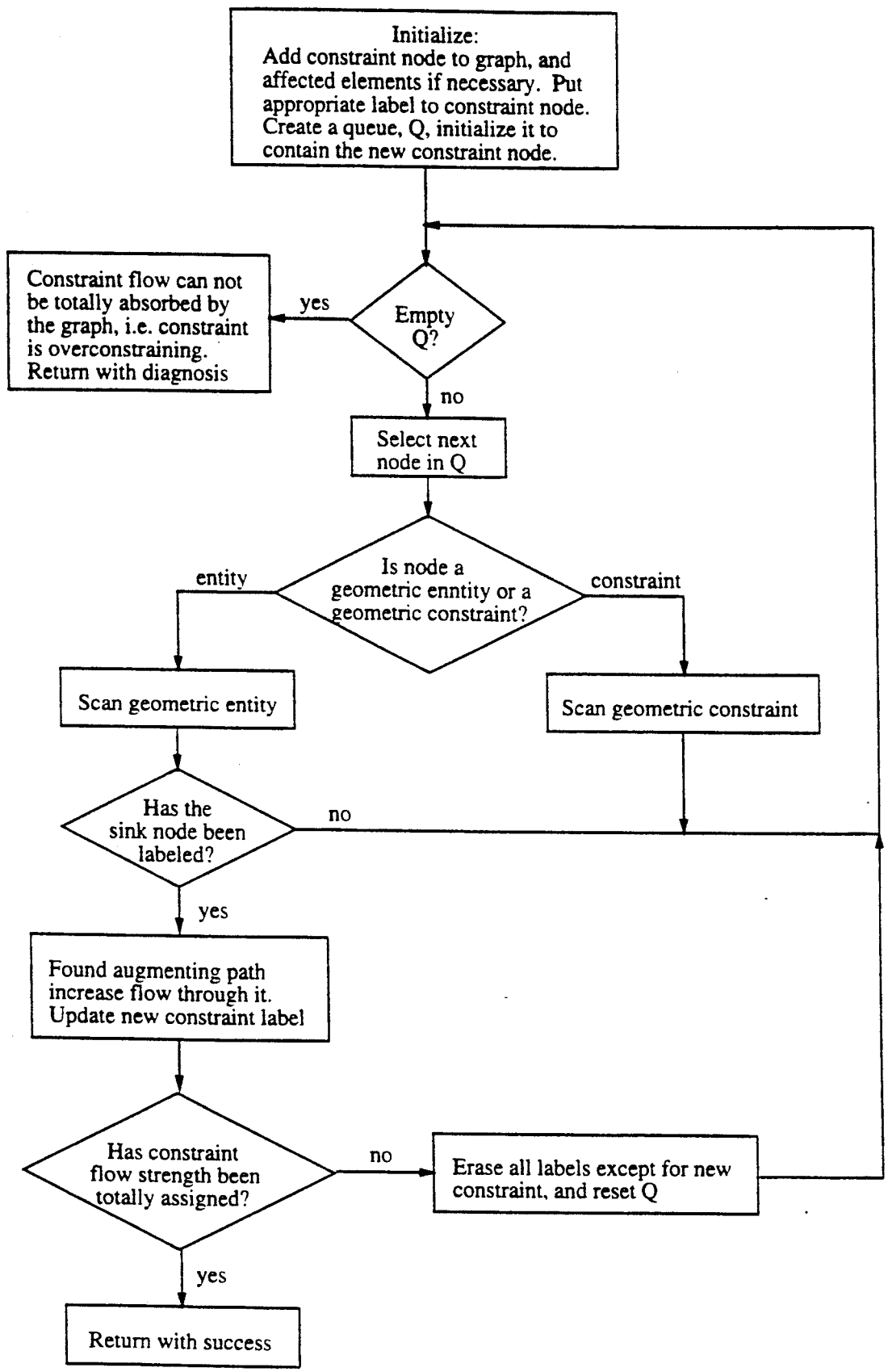
FIGS. 10A-C are high-level flow charts diagraming the operation of the "Max-Flow" program in which FIG. 10B describes the "Scan Geometric Entity" subroutine and FIG. 10C depicts the "Scan Geometric Constraint" subroutine.
Figure 10B:
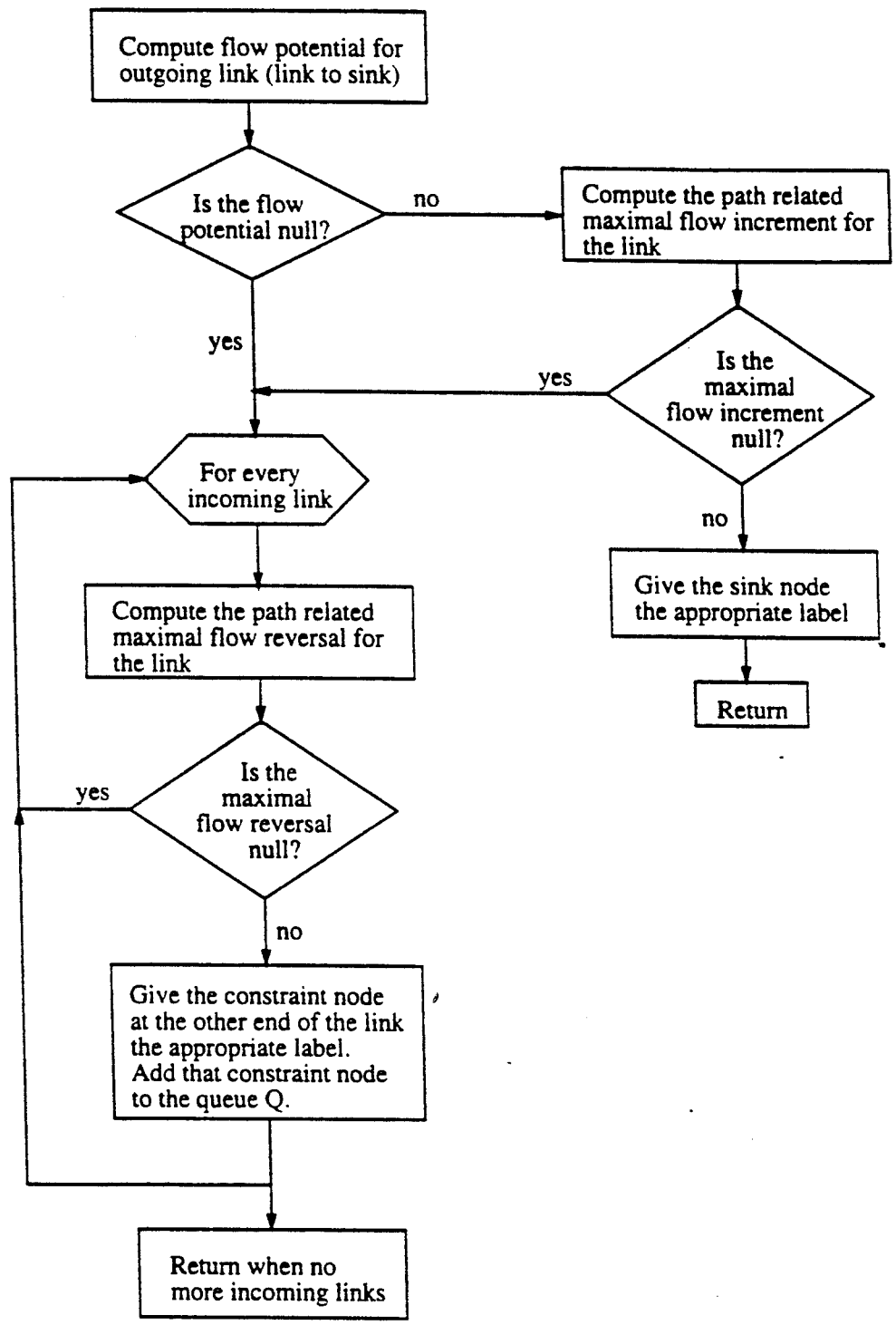
Figure 10C:
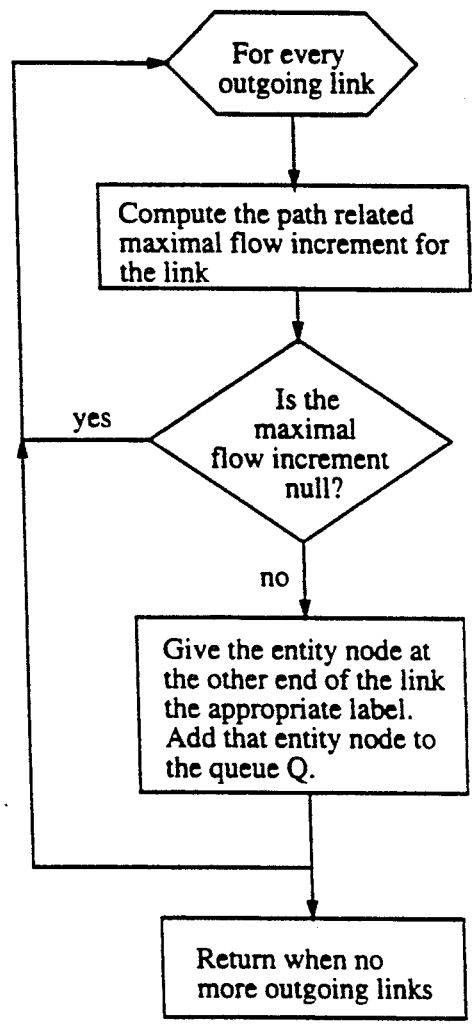
Figure 11A:
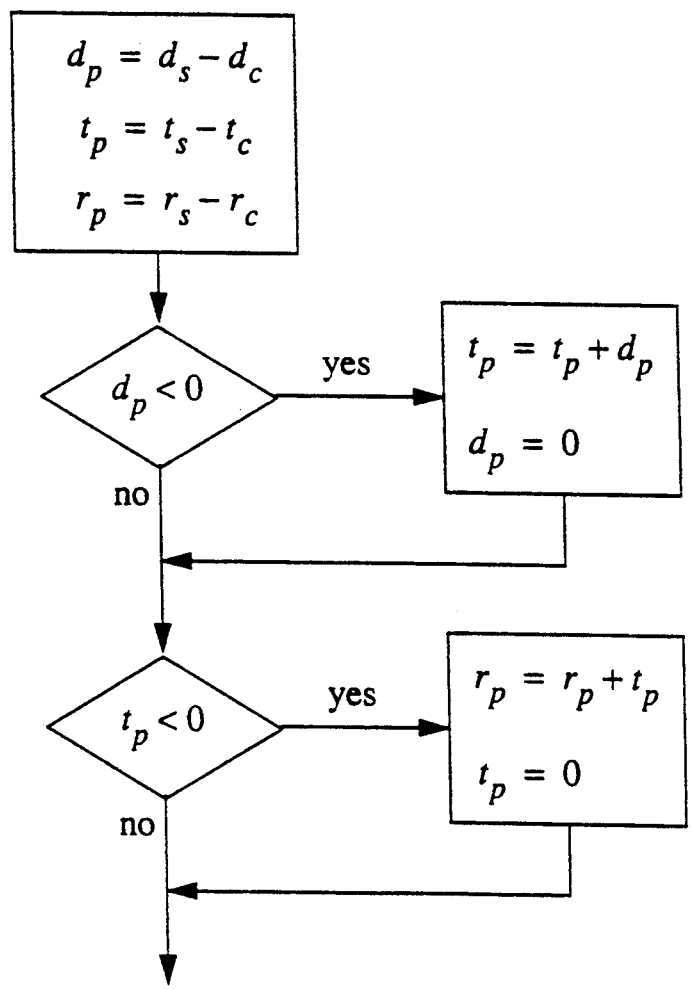
FIGS. 11A-E are detailed flow charts illustrating mathematics of the program code for defining flow interaction functions in the process of searching for an augmenting path.
Figure 11B:
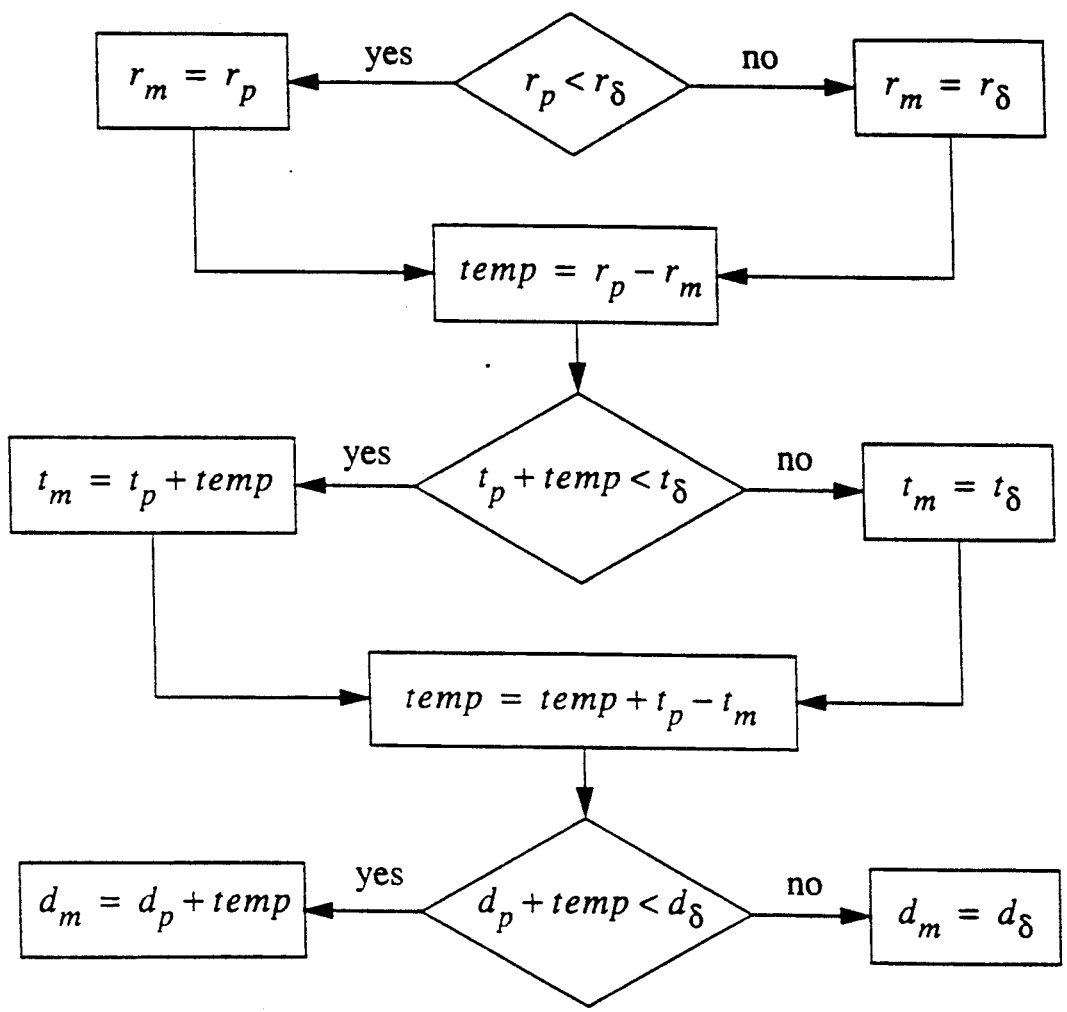
Figure 11C:
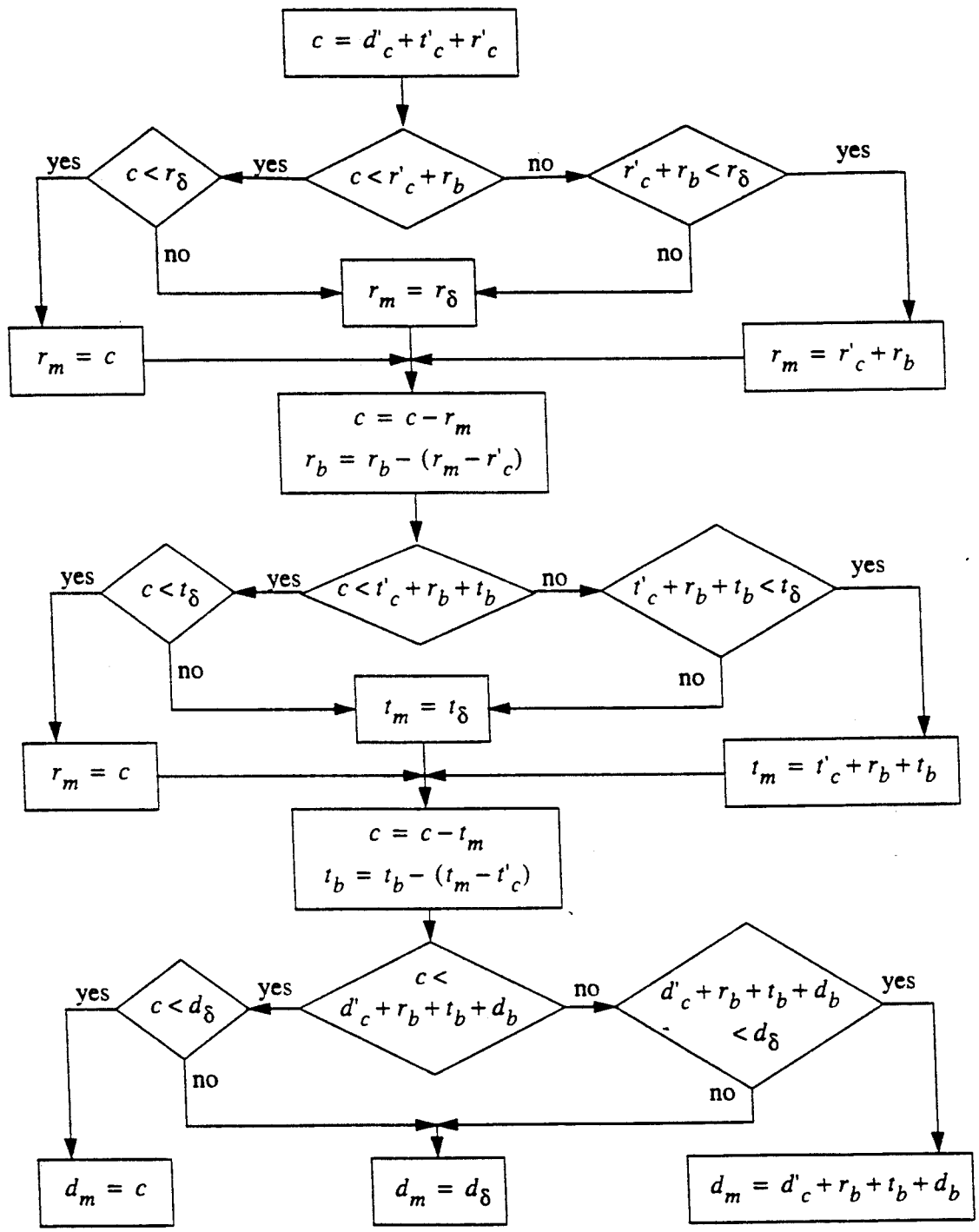
Figure 11D:
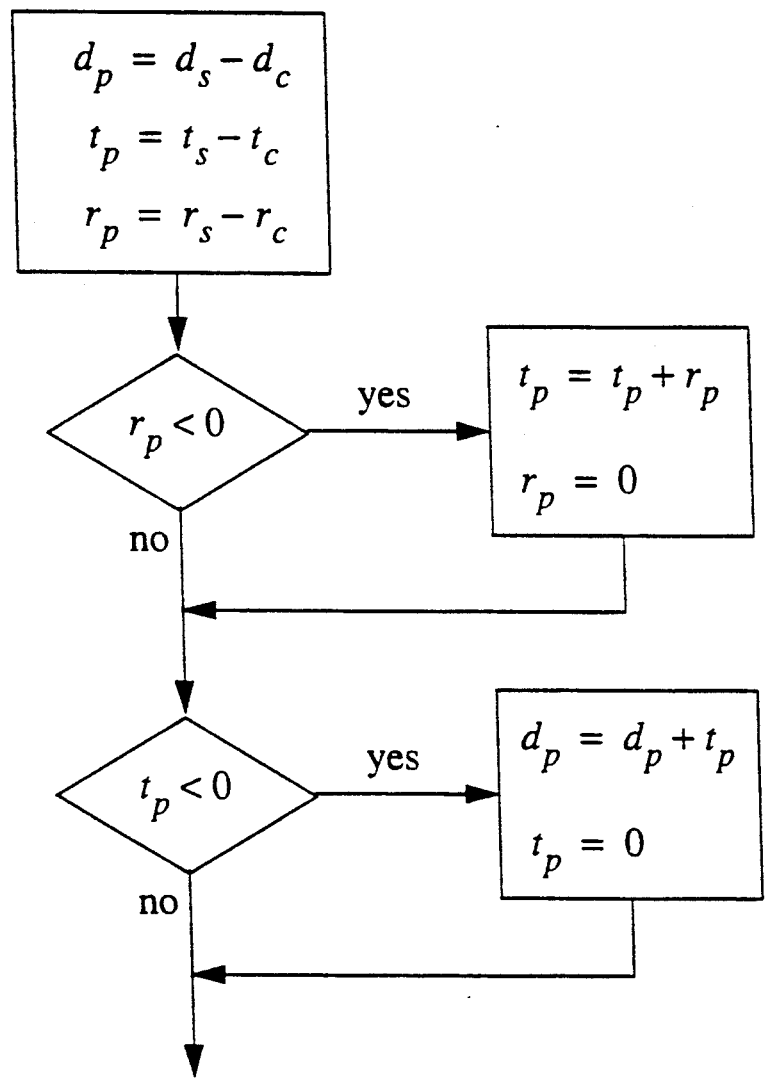
Figure 11E:
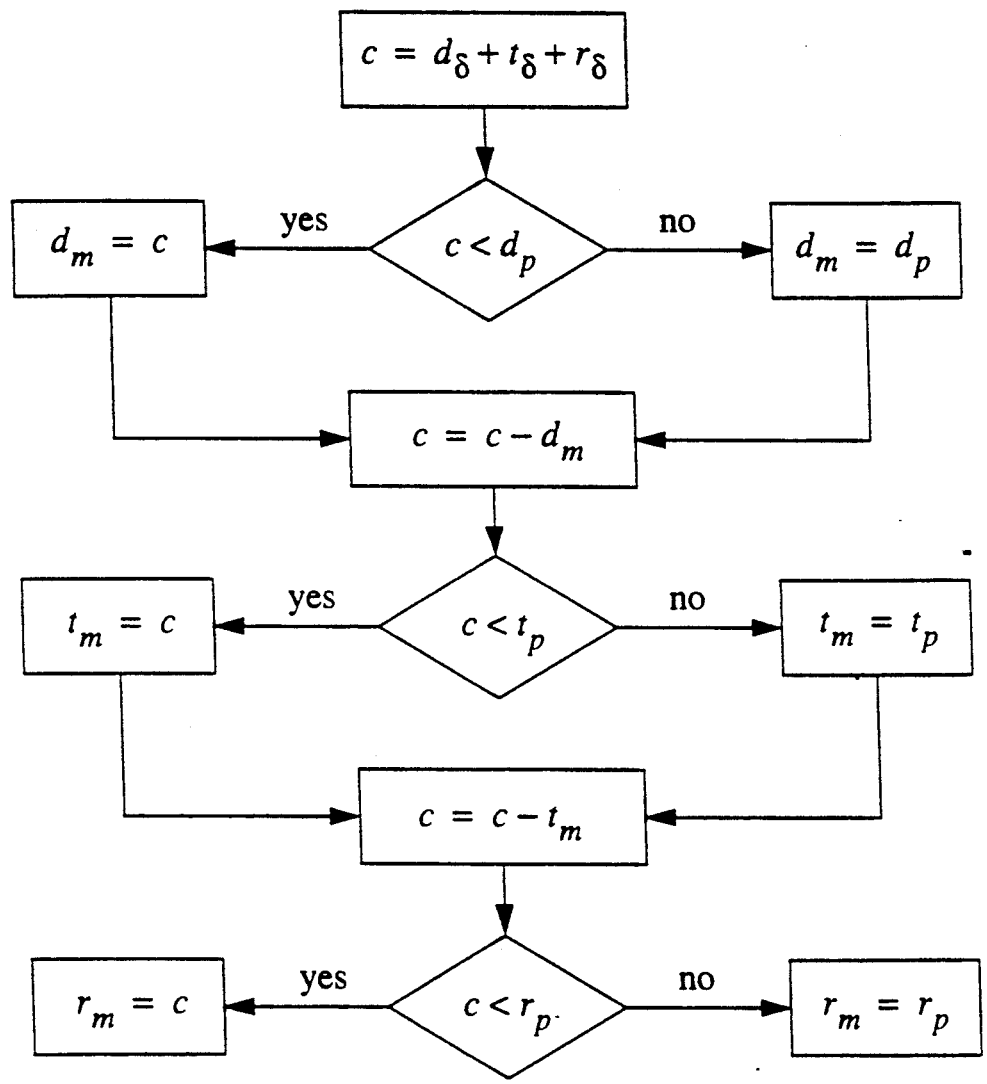
Figure 22:
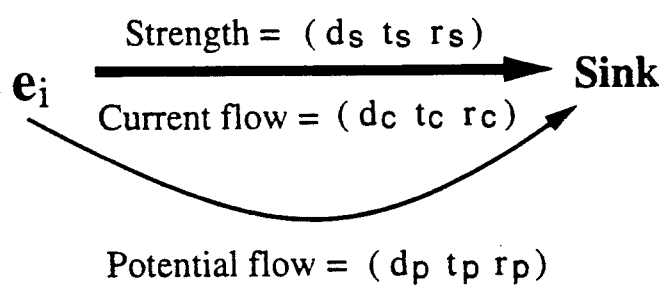
FIG. 22 illustrates the computation for the flow potential for links connecting geometric elements to a sink.
Figure 23:
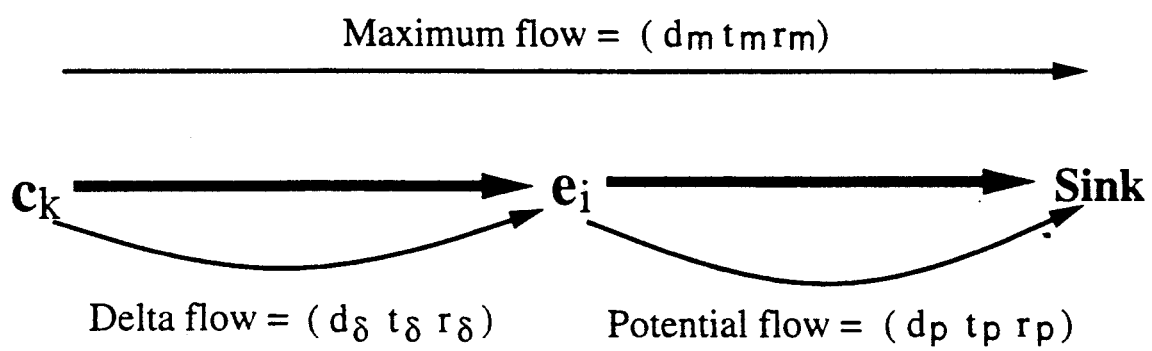
FIG. 23 illustrates maximal augmenting flow links connecting geometric elements to a sink.

When a new constraint is added to the model proceed as follows:

(1) Start
(1.1) If any of these elements affected by the constraint are not yet part of the graph, add them according to the previous procedure.
1.2) Create a node representing the constraint and add it to the set c. Call this node the source node. Assign to this node the label, $(,(d_s,t_s,r_s))$, where $(d_s,t_s,r_s)$ represents the constraint strength assigned according to the table of FIG. 7.
Create links between the source and the nodes representing the affected elements. Set the flow capacity (strength) of these links according to the table of FIG. 8. And set the current flow through these links to be the null flow, (0,0,0).
(1.4) Create, Q of labeled but unscanned nodes and initialed it to {source}
(2) Labeling and Scanning
FIGS. 10A–C depict the high level flow diagrams for the Max-flow solution technique described below.
(2.1) If Q is empty (all labeled nodes have been scanned), go to Step (4).
(2.2) Select the next node in Q and scan it as follows (steps 2.2.a if the node is a geometric element and steps 2.2. b if the node is a geometric constraint):
(2.2.a) If the node represents a gometric element, $e_i$ (FIG. 10B)
(2.2.a.1) Compute the flow potential for the link between the node $e_i$ and sink (FIG. 22). If the flow capacity of the link (link strength) is given by, $(d_s,t_s,r_s)$, and the current flow through the link is, $(d_c,t_c,r_c)$, then, the link's potential for flow increase $(d_p,t_p,r_p)$, can be obtained through the following procedure:

$d_p = d_s - d_c$
$t_p = t_s - t_c$
$r_p = r_s - r_c$
when  $d_p < 0$
    $t_p = t_p + d_p$
    $d_p = 0$
when  $t_p < 0$
    $r_p = r_p + t_p$
    $t_p = 0$ If the flow potential for the link, $(d_p,t_p,r_p)$ is null, go to Step (2.2.a.4).
(2.2.a.2) Compute the path-related maximal flow increment for the link between the node $e_i$ and sink. If the flow potential for the link is given by, $(d_p,t_p,r_p)$, and the node $e_i$ has the label $(c_k+, (d_\delta,t_\delta,r_\delta))$ (see FIG. 23), then, the path-related maximal flow increment through the link, $(d_m,t_m,r_m)$, can be obtained through the following procedure:

$r_m = min\{r_p, r_\delta\}$ $temp = r_p - r_m$ $t_m = min\{t_p + temp.t_\delta\}$ $temp = temp + t_p - t_m$ $d_m = min\{d_p + temp.d_\delta\}$ If the flow increment, $(d_m,t_m,r_m)$, is null, go to Step (2.2.a.4).

Figure 24:
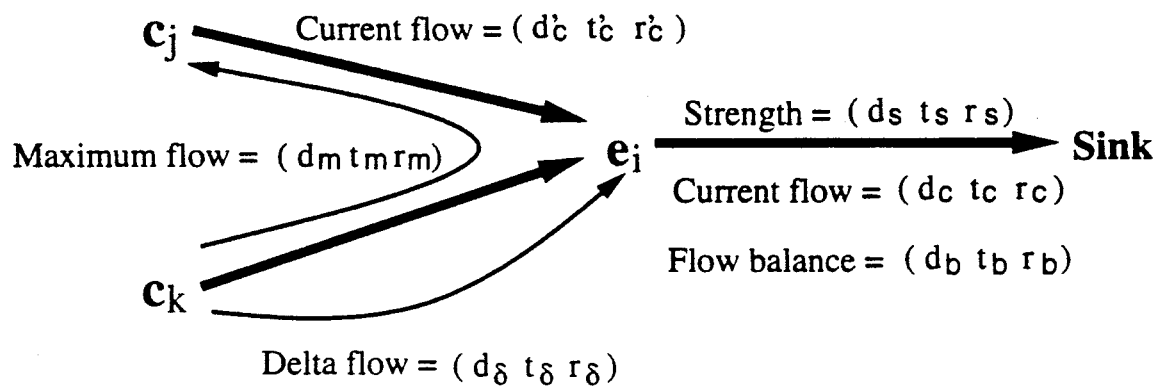
FIG. 24 illustrates maximal flow reversal for links between constraints and elements.
Figure 25:
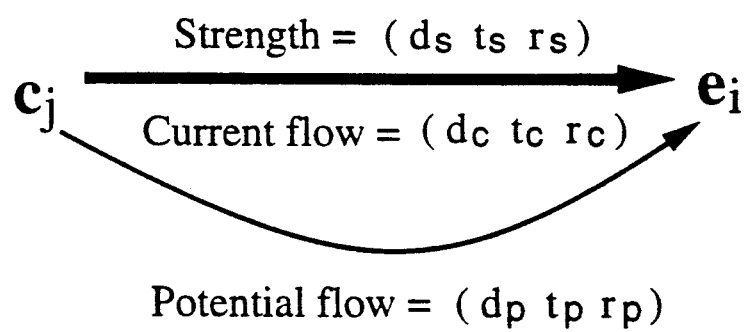
FIG. 25 depicts potential flow for links between constraints and geometric elements.

(2.2.a.3) Assign to the sink node the label, $(e_i+, (d_m,t_m,r_m))$, and go to Augmentation Step (3).
(2.2.a.4) Given that the flow capacity of the link connecting the node $e_i$ to sink is, $(d_s,t_s,r_s)$, and that the current flow through this link is, $(d_c,t_c,r_c)$, define the flow balance for this link, $(d_b,t_b,r_b)$, as $d_b = d_s - d_c$ $t_b = t_s - t_c$ $r_b = r_s - r_c$ (2.2.a.5) If there are no links going into $e_i$ from unlabeled constraints and carrying a non-null flow, remove $e_i$ from Q and go to Step (2.1).
(2.2.a.6) Find a link with non-null flow going into $e_i$ from an unlabeled constraint, say, $c_j$. If the current flow through the link is, $(d'_c,t'_c,r'_c)$, and the node $e_i$ has the label $(c_k+, (d_\delta,t_\delta,r_\delta))$; then the path-related maximal flow reversal through this link, $(d_m,t_m,r_m)$, can be obtained through the following procedure (FIG. 24):

$c = d'_c t'_c + r'_c$ $r_m = min\{c, (r'_c + r_b).r_\delta\}$ $c = c - r_m$ $r_b = r_b - (r_m - r'_c)$ $t_m = min\{c, (t'_c + r_b + t_b).t_\delta\}$ $c = c - t_m$ $t_b = t_b - (t_m - t'_c)$ $d_m = min\{c, (d'_c + r_b + t_b + d_b).d_\delta\}$ If the flow reversal, $(d_m,t_m,r_m)$, is non-null, assign to the $c_j$ node the label, $(e_i-, (d_m,t_m,r_m))$, and add $c_j$ to the end of Q. Go to Step (2.2.a.5).
(2.2.b) If the node represents a gometric constraint, $c_j$, (FIG. 10C) then for each link coming from $c_j$ do the following:
(2.2.b.1) If there are no more links coming from $c_j$, remove $c_j$ from Q and go to Step (2.1).
(2.2.b.2) Select the next link coming from $c_j$ and compute link's potential for flow increase. If the flow capacity of the link (link strength) is given by, $(d_s,t_s,r_s)$, and the current flow through the link is, $(d_c,t_c,r_c)$ (see FIG. 25), then, the link's potential for flow increase, $(d_p,t_p,r_p)$, can be obtained through the following procedure:

$d_p = d_s - d_c$
$t_p = t_s - t_c$
$r_p = r_s - r_c$
when  $r_p < 0$
    $t_p = t_p + r_p$
    $r_p = 0$
when  $t_p < 0$
    $d_p = d_p + t_p$
    $t_p = 0$ If the flow potential for the link, $(d_p,t_p,r_p)$, is null, go to Step (2.2.b.1).

Figure 26:
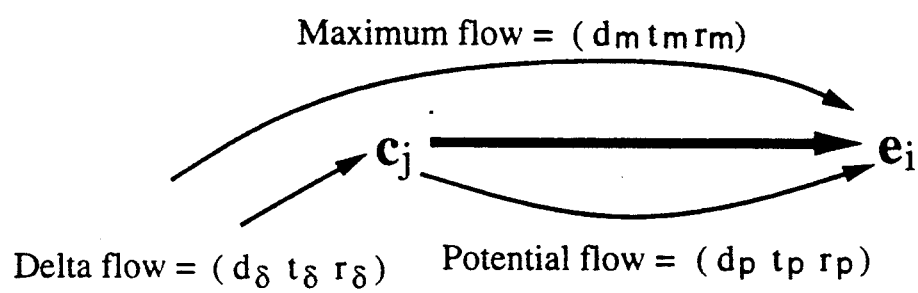
FIG. 26 shows the maximal augmenting flow for links between constraints and elements.

(2.2.b.3) Compute the path-related maximal flow increment for the link. If the flow potential of the link is given by, $(d_p,t_p,r_p)$, and the node $c_j$ has the label $(i_k^-, (d_\delta,t_\delta,r_\delta))$ (see FIG. 26), then, the path-related maximal flow increment through the link, $(d_m,t_m,r_m)$, can be obtained through the following procedure:

$c = d_\delta + t_\delta + r_\delta$ $d_m = \min\{c, d_p\}$ $c = c - d_{min}$ $t_m = \min\{c, t_p\}$ $c = c - t_m$ $r_m = \min\{c, r_p\}$ If the flow increment, $(d_m,t_m,r_m)$, is non-null, then if $e_i$ is the node at the other end of the link, assign to $e_i$ the label, $(c_j^+,(d_m,t_m,r_m))$, and add $e_i$ to the end of Q.

Go to Step (2.2.b.1).

(3) Augmentation. Starting at the sink node, use the index labels to construct an augmenting path. (The label on sink indicates the second-to-last node in the path, the label on that node indicates the third-to-last node, and so on. FIG. 14 shows an augmenting path for the graph configuration in FIG. 13). Augment the flow by increasing and decreasing the link flows by $\delta_{sink}$, as indicated by the superscripts on the index labels. (FIG. 15 presents the new flows for the problem example.) Erase all labels, except for the source. Go to Step (1).

Updating the flow through a link connecting a geometric element to sink

If the previous flow through the link was, $(d_c,t_c,r_c)$ and the flow increment through the augmenting path found is, $(d_\delta,t_\delta,r_\delta)$, then the new flow through the link, $(d_n,t_n,r_n)$, is given by:

$d_n = d_c + d_\delta$ $t_n = t_c + t_\delta$ $r_n = r_c + r_\delta$

Increasing the flow through a link connecting a geometric constraint to a geometric element If the link flow capacity is, $(d_s,t_s,r_s)$, the previous flow through the link was, $(d_c,t_c,r_c)$, and the flow increment through the augmenting path found is, $(d_\delta,t_\delta,r_\delta)$, then the new flow through the link, $(d_n,t_n, r_n)$, is given by:

$d_n = d_c + d_\delta$
$t_n = t_c + t_\delta$
$r_n = r_c + r_\delta$
when $r_n > r_s$
$\quad t_n = t_n + (r_n - r_s)$
$\quad r_n = r_s$
when $t_n > t_s$
$\quad d_n = d_n + (t_n - t_s)$
$\quad t_n = t_s$ And the flow increment used for the remaining links along the augmenting path is recomputed according to:

$d_\delta = d_n - d_c$ $t_\delta = t_n - t_c$ $r_\delta = r_n - r_c$

Decreasing the flow through a link connecting a geometric constraint to a geometric element If the previous flow through the link was, $(d_c,t_c,r_c)$, and the flow increment through the augmenting path found is, $(d_\delta,t_\delta,r_\delta)$, then the new flow through the link, $(d_n,t_n,r_n)$, is given by:

$d_n = d_c - d_\delta$
$t_n = t_c - t_\delta$
$r_n = r_c - r_\delta$
when $d_n < 0$
$\quad t_n = t_n + d_n$
$\quad d_n = 0$
when $t_n < 0$
$\quad$ if $d_n > (-t_n)$
$\quad\quad d_n = d_n + t_n$
$\quad\quad t_n = 0$
$\quad$ else if $d_n > 0$
$\quad\quad t_n = t_n + d_n$
$\quad\quad d_n = 0$
$\quad r_n = r_n + t_n$
$\quad t_n = 0$
when $r_n < 0$
$\quad$ if $d_n > (-r_n)$
$\quad\quad d_n = d_n + r_n$
$\quad\quad r_n = 0$
$\quad$ else if $d_n > 0$
$\quad\quad r_n = r_n + d_n$
$\quad\quad d_n = 0$
$\quad t_n = t_n + r_n$
$\quad r_n = 0$ And the flow increment used for the remaining links along the augmenting path is recomputed according to:

$d_\delta = d_c - d_n$ $t_\delta = t_c - t_n$ $r_\delta = r_c - r_n$

Updating a constraint label

If the previous constraint label (the portion of the constraint strength that has not been used) was, $(d_o,t_o,r_o)$, and the flow increment through the last augmenting path found is, $(d_\delta,t_\delta,r_\delta)$, then after performing the flow augmentation, the constraint label is updated. The new constraint label, $(d_n,t_n,r_n)$, is computed according to the following procedure:

$d_n = d_o - d_\delta$
$t_n = t_o - t_\delta$
$r_n = r_o - r_\delta$

-continued when $r_n < 0$ $t_n = t_n + r_n$ $r_n = 0$ when $t_n < 0$ $d_n = d_n + t_n$ $t_n = 0$ (4) End. The existing flow is maximal. The computation is completed. (FIG. 16 presents a maximal flow configuration for the problem example).

The complexity of the algorithm is O(fn), where f is the maximum flow and n is the number of links equal to ($2n_c+n_e$), $n_c$ is the number of constraints and $n_e$ the number of elements. This means that for each new constraint added to the network the complexity of the problem is linear, due to the fixed flow capacity of the new constraint node (constraint strength).

FIG. 5B shows the result after applying the max-flow algorithm to the graph in FIG. 5A. Dashed arrows represent links with null flow assigned to them.

After a maximum flow has been found constraint dependencies are assigned according to the following criteria. For each binary constraint (constraint acting between two elements) if one of the outgoing links has a null flow assigned to it, then the corresponding element node is used as the driver (reference) element and the other node (assuming that there is a non-null flow assigned to its link) is used as the drivee (dependent). If both links coming from the constraint node have a null flow assigned to them, then the constraint is redundant or is in conflict with the other constraints in the network. This is also true if the total flow coming from the constraint is less than the constraint node capacity. When both outgoing links have non-null assigned to them, the constraint dependency cannot be sorted. In the late case the constraint is considered to be fully bidirectional.

After the dependencies have been assigned, a digraph (directed graph) is created with the geometric elements represented as nodes in the graph, and the constraints as directed links going from the constraint-driver to the constraint-drivee. Bidirectional constraints are represented by two directed links, one in each direction. FIG. 5D, shows the digraph corresponding to the triangle example.

The next step is to apply the cycle-finding algorithm (described in section 1 earlier) to find the strong components of the graph such as FIG. 5D. The list of strong components in an ordered dependency list which can be used to determine which geometric components in a composite geometric object have to be updated (as well as the order in which these components are to be updated) after a change has been made to the model. Possible changes are for example: changes in dimensional values, addition (deletion) of new (existing) constraints, changes in the atributes of some geometric elements (e.g. slope of a line, coordinates of a point), etc.

For the digraph in FIG. 5D, the list of strong components (ordered dependency list) is:
(P1, L1, P2, L3, P3, L2)

The strong components are updated sequentially in the order given by the cycle finding algorithm.

2.4 Program Description

Flow charts for implementing the preferred embodiment of the method of the present invention are shown in FIGS. 1-3 and 10-11. Additionally, an eight page source code listing gives the preferred implementation of applying graph theory and degrees of freedom reasoning in a geometric constraint problem. Permission is hereby given to copy the copyrighted source code appendix when the patent application or patent files are copied.

Turning to FIG. 1, of the present invention initiates procedure 18 to determine an ordered dependency list of geometric entities, which is then used as an execution sequence during geometric modeling. When changes to the geometric model are made update procedure 20 is invoked. Procedure 22 is used to display the geometric entities on display 16.

Figure 3:
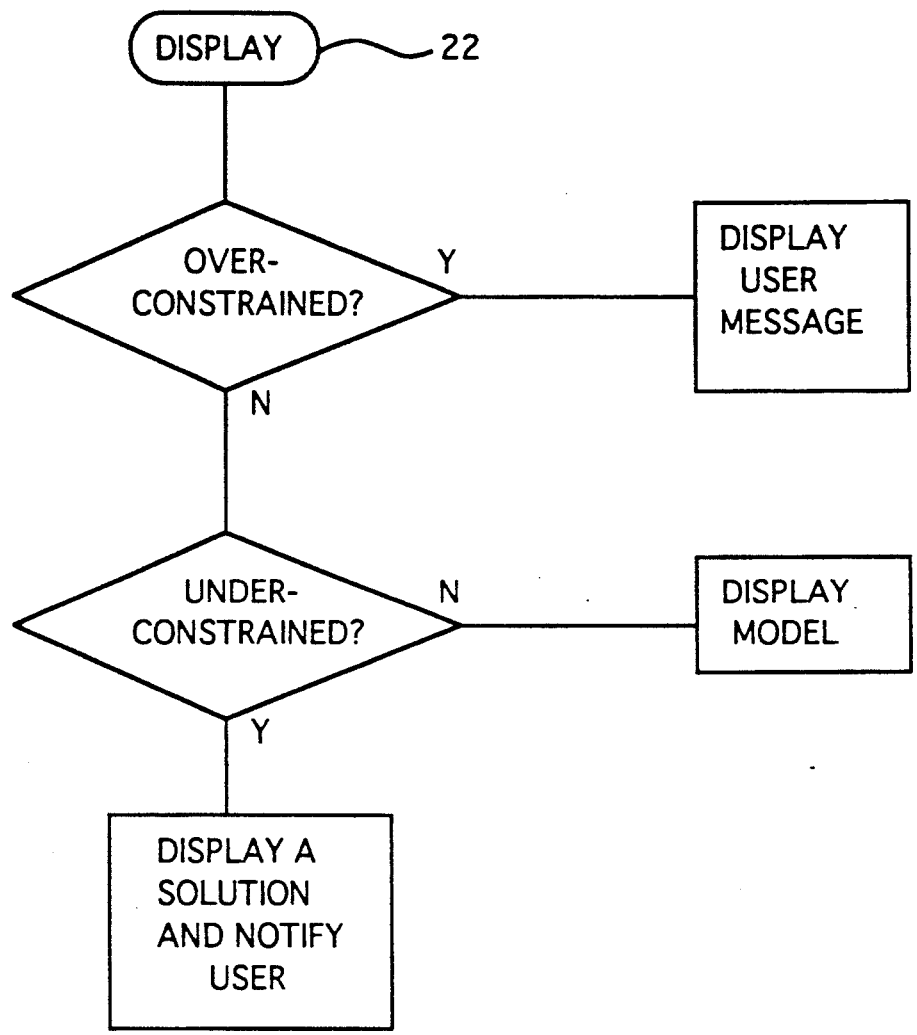
FIG. 3 is a flow chart describing the operation of the display program.

FIG. 3 is a flow chart depicting the display procedure 22. As can be seen from FIG. 3, if the proposed geometric model is over-constrained a user is notified. If the proposed geometric model is fully constrained the system 10 displays the model, while if the proposed geometric model is under-constrained a version of the model is displayed and the user is notified that the system is under-constrained. Examples of over-constrained, under-constrained, and fully constrained are discussed below in conjunction with FIGS. 4-6.

Figure 2:
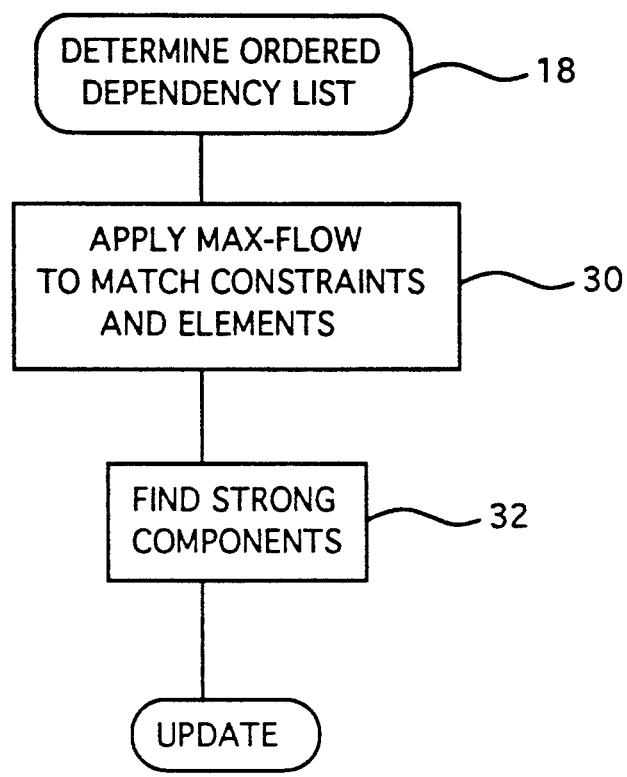
FIG. 2 is a flow chart describing an overview of the method and program code for determining the ordered dependency list.

In more detail, FIG. 2 illustrates broadly the procedure 18 for determining the ordered dependency list of geometric entities. As can be seen from FIG. 2, procedure 18 applies the max-flow graph solution technique 30 to match constraints and elements (i.e. find constraint dependency). After finding the constraint dependencies, a second directed graph is formulated and the strong components or cycles are formed as of 32. The list of strong components is used as an execution sequence for geometric modeling by the system 10.

Turning to the source code appendix, pages 1-5 of "graphs.lisp" list the preferred code for procedures 30 and 32 of FIG. 2. Pages 1-3 of the "flow.lisp" list routines useful for implementing degrees of freedom reasoning in a graph flow problem.

As can be seen from the comment fields on pages 1 and 2 of "graphs.lisp," update routines are listed for updating the geometric model. That is, routines are given for adding and removing geometric constraints and entities from the graphs as well as resetting, deleting, and appending graphs. Another update routine is given on page 5 of "graphs.lisp" in which the parameter value of a constraint or entity is changed. As can be seen from the routine on page 5, if a strong component to be updated comprises a single geometric entity, constructive geometry techniques are invoked while if the strong component to be updated involves multiple geometric entities, the small problem is passed to an iterative solution technique (such as Newton-Raphson). Such constructional geometry solution techniques are known. See for example J. C. H. Chung and M. D. Schussel, Comparison of variational and parametric design, in *Autofact*-89, Detroit, Mich., 1989. Similarly, iterative solution techniques are known, see e.g., R. A. Light and D. C. Gossard, Modification of geometric models through variational geometry, *Computer-Aided Design*, 14(4), 1982. The art cited on pages 1-3 list other known techniques.

Moving to page 3 of "graphs.lisp" the code for implementing the max-flow procedure 30 is given. FIG. 10A is a flow chart schematically depicting the function of max-flow procedure 30. As can be seen, a first check is done to determine if an over-constraining situation exists, and if so a diagnosis (warning) is given to the user. If an over-constraining situation does not exist, the procedure searches for an augmenting path and scans depending upon whether a geometric constraint or a geometric entity is present. The code on pages 3-4 of "graphs.lisp" should be compared with flow charts of FIGS. 10B and 10C for scanning methods.

After matching the constraints and entities, the procedure 32 for finding the strong components of the geometric model is implemented. This code is listed on pages 4-5 of "graph.lisp." The list of strong components is used as an ordered dependency list for execution.

In pages 1-3 of "flow.lisp" code is listed for implementing the degrees of freedom reasoning of graph flow solution techniques. Of particular importance are the flow interaction functions for searching for an augmenting path from source to sink. On pages 1-2 of "flow.lisp" five functions are listed A-E. The mathematics and logic of these functions are schematically illustrated in the corresponding flow charts FIGS. 11A-11E.

3. Examples of Operation

Figure 4D:
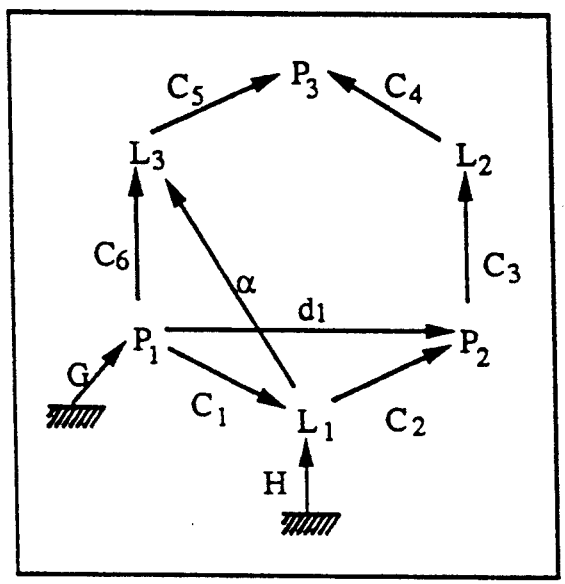
Figure 4E:
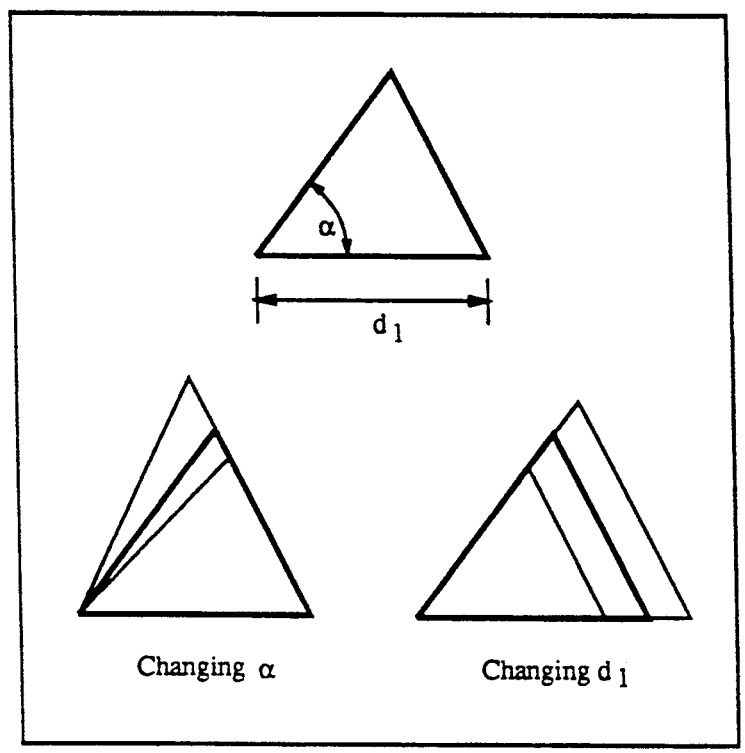
Figure 5C:
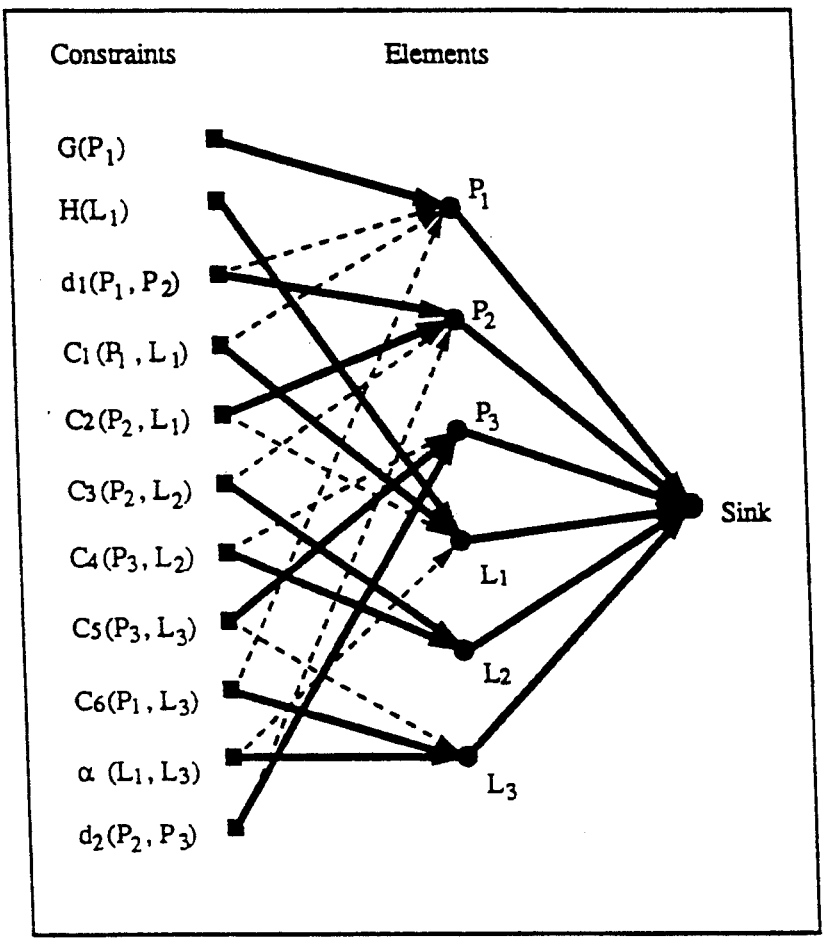
Figure 5D:
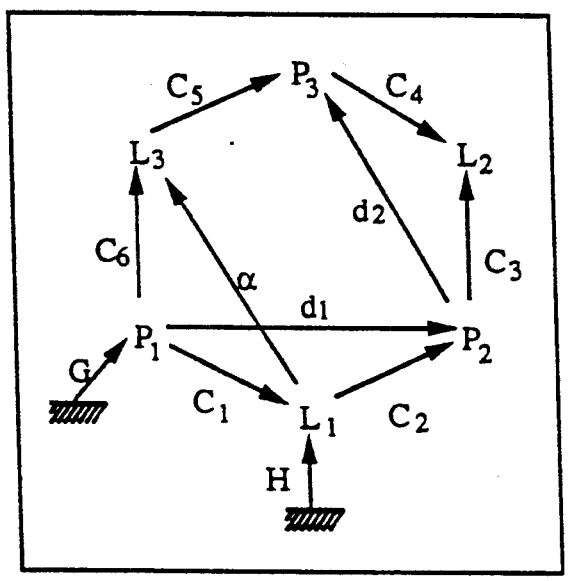
Figure 5E:
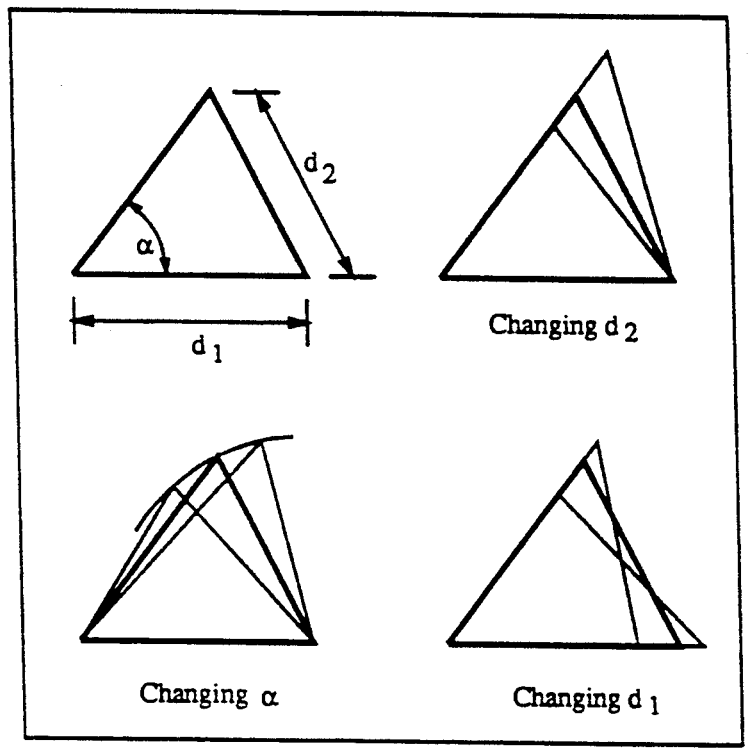
Figure 6C:
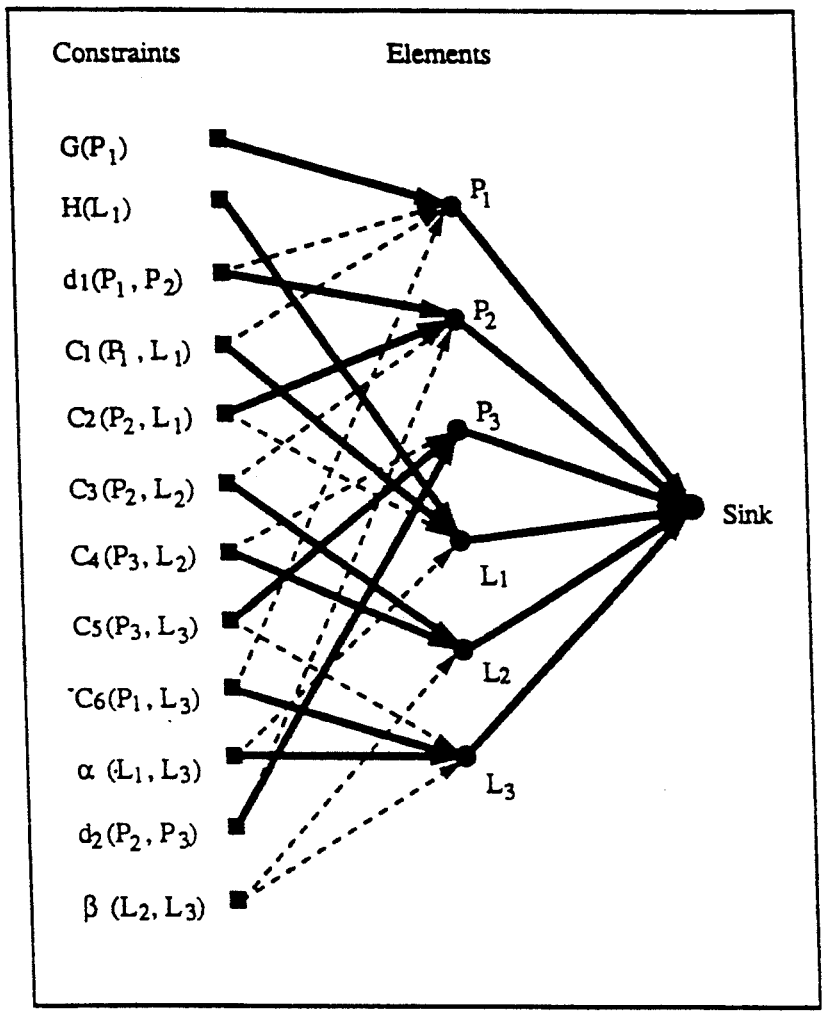

FIGS. 4-6 represent examples of operation of the system 10 and method of the present invention in modeling a parametric triangle. FIGS. 4A-E depict a parametric triangle in an under-constrained situation; FIGS. 5A-E represent a parametric triangle in a fully constrained situation; and FIGS. 6A-C depict a parametric triangle in an over-constrained situation.

In FIGS. 4-6 the procedures described above (e.g. sections 2.1-2.3) are used to solve for the ordered dependency list. That is, first a directed graph is constructed with the constrains and geometric entities as nodes in the graph and flow capacity corresponding to the degrees of freedom assigned to the links between the nodes. The graph is solved for a maximal flow configuration (in an under-constrained situation there may be several configurations) to a sink node finds the solution assigns or matches the constraints to the geometric entities.

A second directed graph is then created with the geometric entities acting as nodes and the constraints as links between the nodes directed according to the assigned constraint dependencies. The cycles or strong components of the second directed graph are found and the strong component listing utilized as an ordered dependency list for execution during computer-aided modeling. In the graph as shown in FIG. 4A a parametric triangle comprising points $P_1$, $P_2$, $P_3$ and lines $L_1$, $L_2$, and $L_3$ is depicted. The constraints of the geometric model of FIG. 4 are listed as the first layer of nodes in FIG. 4B. For example, point $P_1$ is grounded and line $L_1$ is constrained to be horizontal. The distance $d_1$ is defined for the distance between points $P_1$ and $P_2$ and angle alpha defined between lines $L_1$ and $L_3$. The remaining constrains $C_1$–$C_6$ are constraints where a point and a line are coincident (with a corresponding strength in 2D of (0 1 0)).

After assigning a flow capacity to each of the constraint nodes in FIG. 4B, (utilizing e.g. FIG. 7), the capacities for the links between the constraints and elements are assigned using the flow capacities from FIG. 8. Similarly, the flow capacities are assigned to the links between the geometric elements and the sink node utilizing the corresponding degrees of freedom of the table from FIG. 9.

Applying the maximum flow solution techniques (discussed in sections 1 and 2.3) to the graph of FIG. 4B builds the solution graph of FIG. 4C. There are three criteria for assigning constraint dependencies. First, for a constraint acting between two elements if one of the outgoing links is a null flow, then the corresponding entity node is used as the driver and the entity node is used as the drive. If both links coming from the constraint node have null flow then the constraint is redundant or in conflict with other constraints in the network. Finally, if both outgoing links have non-null flow assigned to them the constraint dependency cannot be sorted and the constraint is considered to be bidirectional. Directional constraints are represented by two directed links, one in each direction (not shown in FIG. 4C).

Applying the cycle finding technique (in procedure 32) builds the directed graph of FIG. 4D. In FIG. 4D the list of strong components is:
($P_1$, $L_1$, $P_2$, $L_3$, $L_2$, $P_3$)
The list of strong components is used as an execution sequence when changes are made to the parameter values or the constraints. Examples are shown in FIG. 4E. For example, changing alpha affects only $L_3$, and $P_3$ with minimum disturbance to the system. On the other hand, change $d_1$ seems to have an affect on $P_2$. Using the strong component list as an execution sequence, $L_3$, $L_2$, $P_3$ are similarly updated.

FIGS. 5A-5E are similar to FIGS. 4A-E, to illustrate a fully constrained example in which the constraint of $d_2$ is added (the distance between $P_2$ and $P_3$). FIGS. 5B and 5C show the max-flow solution for determining the constraint dependencies while FIG. 5D depicts the solution for finding the list of strong components. Following FIG. 5D gives a strong component listing of:
($P_1$, $L_1$, $P_2$, $L_3$, $P_3$, $L_2$)
Here again the strong components are used as an ordered dependency list for an execution sequence when changes are made to the model. FIGS. 6A-6C show the parametric triangle example when an additional constraint is made defining the angle beta between lines $L_2$ and lines $L_3$. For the value of beta in FIGS. 6A-6C the model is over-constrained and solution with the additional constraint is not possible. From the code listing on page 3 of "graphs.lisp" a message would be returned to the modeler "warning: over constraining constraint."

```
        (dolist (c (sends graph constraint-list))
              (unless (satisfiable-constraint? c)
                    (sends graph maximize-flow nil c)))
;;********** NOTE: Always clears the strong components slot.
(sends graph strong-components put nil)
;;********** returns the removed constraint
constraint)
)

;;;;------------------------------------------------------------------------
;;;; Adding a geometric entity to the graph
;;;;------------------------------------------------------------------------
(defun geometry-graph.add-element (graph slot facet new-element)
```

```lisp
        (declare (ignore slot facet))
        (unless (member new-element (value? (sends graph element-list))
                        :test 'same-object)
        ;;********** NOTE: Nov. 19/90 modification performed to allow the addition
        ;;********** of features to the graph. In this version, the feature elements are
        ;;********** added first (one by one), and the constraints are added next.
        ;;********** In this way the graph maintains a FLAT topology.
          (cond ((descendant? 'feature new-element)
                  (dolist (lower-el (sends new-element geometry-elements))
                    (sends graph add-element nil lower-el))
                  (dolist (co (sends new-element constraint-objects))
                    (sends graph add-constraint nil co))
        ;;********** returns the element
                  new-element)
        ;;********** works normally for a basic geometry element
                ((basic-geometry-element? new-element)
                 (addvalue graph 'element-list (objectname new-element))
                 (let ((sink (sends graph sink get))
                       link)
                   (setq link (make-link :from-node new-element :to-node sink
                                         :strength (sends new-element dof get)
                                         :current-flow *null-flow*))
        ;;********** NOTE: there is only one link out of the element (singular)
                   (putvalue new-element 'out-link link)
                   (addvalue sink 'in-links link)
                   (addvalue graph 'link-list link))
        ;;********** returns the element
                 new-element)
                (t
                 (hg.message
                  "~&~s~&~s"
                  "Asked to add an unclassified element type to a constraint graph"
                  "Operation not performed")
        ;;********** returns nil for failure
                 nil))
        )
        ;;********** Note that it also returns nil when element is already in graph !
        )

;;;;------------------------------------------------------------------
;;;; Removing a geometric entity from the graph
;;;;------------------------------------------------------------------
(defun geometry-graph.remove-element (graph slot facet element)
  (declare (ignore slot facet))
  ;;********** NOTE: Nov. 19/90 modification performed to allow removing
  ;;********** of features from the graph.
  (cond ((descendant? 'feature element)
         (dolist (lower-el (sends element geometry-elements))
           (sends graph remove-element nil lower-el))
         ;;********** returns the removed element
         element))

;;;;------------------------------------------------------------------
;;;;
;;;; Geometry-graph utilities
;;;;
;;;; (c) Copyright Schlumberger Technology Corp.  Unpublished work.
;;;;
;;;;------------------------------------------------------------------

;;;;------------------------------------------------------------------
;;;; Adding a geometric constraint to the graph
;;;;------------------------------------------------------------------
(defun geometry-graph.add-constraint (graph slot facet new-constraint)
  (declare (ignore slot facet))
  (unless (member new-constraint (value? (sends graph constraint-list))
                  :test 'same-object)
    (addvalue graph 'constraint-list (objectname new-constraint))
    (let ((type (sends new-constraint type get))
          link hg-el)
      (if (eq type 'undirected)
          (dolist (slt (sends new-constraint essential-slots))
            (setq hg-el (sendslot new-constraint slt get)
                  link (make-link :from-node new-constraint :to-node hg-el
                                  :strength (sendslot new-constraint slt dof)
                                  :current-flow *null-flow*))
            (sends graph add-element nil hg-el)  ;; Redundancy for robustness !!!!
            (addvalue new-constraint 'out-links link)
            (addvalue hg-el 'in-links link)
            (addvalue graph 'link-list link))
          ;;********** for unary, or binary-directed constraints only builds a
          ;;********** link to the out (dependent) element
          (let ((dep-el (sends new-constraint out-element)))
            (setq link (make-link :from-node new-constraint :to-node dep-el
```

```
                         :strength (sends new-constraint strength)
                         :current-flow *null-flow*))
         (sends graph add-element nil dep-el)  ;; Redundancy for robustness !!!!
         (addvalue new-constraint 'out-links link)
         (addvalue dep-el 'in-links link)
         (addvalue graph 'link-list link))))
 ;;********** NOTE: Always clears the strong components slot..
 (sends graph strong-components put nil)
 ;;********** Uses the max-flow algorithm to resolve the constraint causality
 (when (sends graph maximize-flow nil new-constraint)
       ;;********** returns the newly added constraint
       new-constraint))
 ;;********** NOTE: returns nil when constraint is overconstraining the model
 )

;;;;----------------------------------------------------------------------
;;;; Removing a geometric constraint from the graph
;;;;----------------------------------------------------------------------
(defun geometry-graph.remove-constraint (graph slot facet constraint)
  (declare (ignore slot facet))
  (when (member constraint (value? (sends graph constraint-list))
               :test 'same-object)
    (removevalue graph 'constraint-list (objectname constraint))
    (let (hg-el)
      (dolist (link (sends constraint out-links))
        (setq hg-el (link-to-node link))
        (removevalue hg-el 'in-links link)
        (update-element-out-flow hg-el)
        (removevalue graph 'link-list link))
      (putvalue constraint 'out-links nil)))
  ;;********** Look for overconstraining constraints and try to satisfy them
(defun geometry-graph.append (graph slot facet new-graph)
  (declare (ignore slot facet))
  (let ((source (sends graph source get))
        (sink   (sends graph sink get))
        link)
    (dolist (el (sends new-graph element-list))
      (setq link (sends el out-link))
      (setf (link-to-node link) sink)
      (addvalue graph 'element-list el)
      (addvalue graph 'link-list link))
    (dolist (co (sends new-graph constraint-list))
      (dolist (link (sends co out-links))
        (addvalue graph 'link-list link))
      (addvalue graph 'constraint-list co))
    (dolist (link (sends (sends new-graph source) out-links))
      (setf (link-from-node link) source)
      (addvalue graph 'link-list link)))
  ;;********** Clears the values in the slots of the new-graph before deletion
  (putvalue new-graph 'element-list nil)
  (putvalue new-graph 'constraint-list nil)
  (putvalue new-graph 'link-list nil)
  (putvalue new-graph 'source nil)
  (putvalue new-graph 'sink nil)
  (sends new-graph delete bottomupadditiveinheritance)
  ;;********** NOTE: Clears the strong components slot.
  (sends graph strong-components put nil)
  ;;********** returns the enlarged graph
  graph)

;;;;----------------------------------------------------------------------
;;;; This method asumes that the max-flow algorithm has been applied to each
;;;; of the constraints in the constraint-list slot of the graph
;;;;----------------------------------------------------------------------
(defun geometry-graph.solve (graph slot facet &key reset element constraint)
  (declare (ignore slot facet))
  (when reset
    ;;********** When reset is required: reset the graph flows, then
    ;;********** applies the max-flow algorithm to each constraint.
    (sends graph reset)
    (dolist (co (sends graph constraint-list get))
      (sends graph maximize-flow nil co)))
  (let ((strong-components (sends graph strong-components get)))
    ;;********** recompute the strong components whenever necessary
    (unless strong-components
      (sends graph assign-causality)
      (setq strong-components (sends graph strong-components compute)))
    (cond
      ;;********** When an element is passed updates only the downstream elements
      (element
       (update-strong-components
        (member (objectname element) (objectnames strong-components)
                :test 'member)))
      ;;********** When a constraint is passed updates only the downstream elements
      (constraint
```

```
        (do ((rem-comp strong-components (cdr rem-comp)))
            ((null rem-comp)
             (hg.message "-%Constraint -a is not part of the graph -a"
                         constraint graph)
             (hg.message "-%No action taken"))
          (if (dolist (el (car rem-comp))
                (if (member constraint
                            (value? (sends el in-constraints get))
                            :test 'same-object)
        ;;********** works normally for a basic geometry element
        ((basic-geometry-element? element)
         ;; checks if the element is part of the graph
         (when (member element (value? (sends graph element-list))
                       :test 'same-object)
           ;;********** removing an element from the graph causes all the
           ;;********** constraints related to it to be removed as well
           (dolist (link (send? element in-links get))
             (sends graph remove-constraint nil (link-from-node link)))
           (removevalue graph 'element-list (objectname element))
           (let ((sink (sends graph sink get))
                 (link (sends element out-link get)))
             (removevalue sink 'in-links link)
             (removevalue graph 'link-list link)
             (putvalue element 'out-link nil))
           ;;********** NOTE: Always clears the strong components slot.
           (sends graph strong-components put nil)
           ;;********** returns the removed element
           element)
         ;;********** Note that returns nil if element was not in the graph
         )
        (t
         (hg.message
          "-%-s-%-s"
          "Asked to remove an unclassified element type from a constraint graph"
          "Operation not performed")
         ;;********** returns nil for failure
         nil))
)

;;;;---------------------------------------------------------------------------
;;;; Resetting a graph.  Sets the flows in all the graph links to *null-flow*
;;;;---------------------------------------------------------------------------
(defun geometry-graph.reset (graph slot facet)
  (declare (ignore slot facet))
  ;;********** resetting a graph sets the flow in all the links to *null-flow*
  (dolist (link (sends graph link-list get))
    (setf (link-current-flow link) *null-flow*))
  ;;********** NOTE: Clears the strong components slot.
  (sends graph strong-components put nil)
  ;;********** returns the graph
  graph)

;;;;---------------------------------------------------------------------------
;;;; Deleting a graph
;;;;---------------------------------------------------------------------------
(defun geometry-graph.delete (graph slot facet)
  ;;********** This method assumes that all the constraints and elements in the
  ;;********** graph are not associated with any other graph!!!!
  (declare (ignore slot facet))
  (when (individual? graph)
    (dolist (c (sends graph constraint-list get))
      (putvalue c 'out-links nil))
    (dolist (el (sends graph element-list get))
      (putvalue el 'in-links nil)
      (putvalue el 'out-link nil))
    (sends (sends graph source get) delete bottomupadditiveinheritance)
    (sends (sends graph sink get) delete bottomupadditiveinheritance))
  (deleteobject graph))

;;;;---------------------------------------------------------------------------
;;;; The append method appends a second graph to an existing one.  Note, the
;;;; second graph object is deleted after the fact.
;;;;---------------------------------------------------------------------------
                  (scan-hg-element node unscanned-nodes labeled-nodes)))
        ;;********** augmentation when sink has been labeled.
        (when (setq label (sends sink label get))
          (let ((link  (cadr label))
                (delta (cadddr label)))
            (el-fwd-link-add-flow link delta)
            (do ((path-node (caddr label) (caddr label)))
                ((eq path-node source) t)
              (setq label (sends path-node label get)
                    link  (cadr label)
                    delta (cadddr label))
              (cond ((= 1 (car label))
```

```
                    (co-fwd-link-add-flow link delta)
                    (update-element-out-flow path-node))
                (t
                    (co-fwd-link-subtract-flow link delta)))))
            ;;********** returns T for success when augmenting path was found !!
            (return t))
        ))))

;;;;----------------------------------------------------------------------
;;;; Scanning a geometric constraint, done when searching for an augmenting path
;;;;----------------------------------------------------------------------
(defun scan-geometric-constraint (constraint unscanned-nodes labeled-nodes)
    (let ((delta (cadddr (sends constraint label get)))
          out-node potential-flow min-flow)
        (dolist (link (value? (sends constraint out-links get)))
            (setq out-node (link-to-node link))
            (when (and (not (sends out-node label get))
                       (positive-flow?
                         (setq potential-flow (co-fwd-link-potential-flow link)))
                       (positive-flow?
                         (setq min-flow (co-fwd-link-min-flow potential-flow delta))))
                (sends out-node label put (list 1 link constraint min-flow))
                (push out-node labeled-nodes)
                (tconc unscanned-nodes out-node))))
    labeled-nodes)

;;;;----------------------------------------------------------------------
;;;; Scanning a geometric element, done when searching for an augmenting path
;;;;----------------------------------------------------------------------
(defun scan-hg-element (element unscanned-nodes labeled-nodes)
    (let ((delta (cadddr (sends element label get))))
        (let ((out-link (sends element out-link get))
              current-flow potential-flow min-flow)
            (if (and (positive-flow?
                        (setq potential-flow (el-fwd-link-potential-flow out-link)))
                     (positive-flow?
                        (setq min-flow (el-fwd-link-min-flow potential-flow delta))))
                (let ((out-node (link-to-node out-link)))
                    (sends out-node label put (list 1 out-link element min-flow))
                    (push out-node labeled-nodes))
                (let ((flow-balance (mapcar '- (link-strength out-link)
                                              (link-current-flow out-link)))
                      in-node)
                    (dolist (in-link (value? (sends element in-links get)))
                        (setq in-node (link-from-node in-link))
                        (when (and (not (sends in-node label get))
                                   (positive-flow?
                                     (setq current-flow (link-current-flow in-link)))
                                   (positive-flow?
                                     (setq min-flow
                              (return t)))·
                          (return (update-strong-components rem-comp)))))
            (t
              ;;********** When nothing is passed updates all the elements
              (update-strong-components strong-components))))
    ;;********** returns the graph
    graph)

;;;;----------------------------------------------------------------------
;;;; This is the function that implements the max-flow algorithm.
;;;; This version uses breadth first search for augmenting path
;;;; (it is more likely to minimize changes to previous graph status)
;;;; The source argument is the constraint whose out-flow is to be maximized
;;;; NOTE: This version works incrementally on a per-degree-of-freedom basis,
;;;; each time calling maximize-flow-aux.
;;;;----------------------------------------------------------------------
(defun geometry-graph.maximize-flow (graph slot facet source)
    (declare (ignore slot facet))
    (let ((max-flow (constraint.residual-flow source))
          (satisfied? t)
          r-flow t-flow d-flow)
        (multiple-value-setq (d-flow t-flow r-flow) (decompose-flow max-flow))
        (dotimes (i r-flow)
            (unless (maximize-flow-aux graph source '(0 0 1))
                (return (setq satisfied? nil))))
        (dotimes (i t-flow)
            (unless (maximize-flow-aux graph source '(0 1 0))
                (return (setq satisfied? nil))))
        (dotimes (i d-flow)
            (unless (maximize-flow-aux graph source '(1 0 0))
                (return (setq satisfied? nil))))
        (cond (satisfied?
```

```
            ;;********** returns the source (constraint whose flow was maximized)
            source)
           (t
            (hg.message "-% WARNING: Overconstraining constraint")
            ;;********** returns nil as a failure diagnosis
            nil))))

;;;;-------------------------------------------------------------------------
;;;; NOTE: A modification has been made so that this function is used once
;;;; for each single degree of freedom.
;;;;-------------------------------------------------------------------------
(defun maximize-flow-aux (graph source source-delta)
  (let ((node-list (append (sends graph element-list get)
                           (remove source (sends graph constraint-list get)
                                   :test #'same-object :count 1)))
        (sink (sends graph sink get))
        label labeled-nodes)
    ;;********** start
    (putvalue source 'label (list -1 nil nil source-delta))
    (dolist (node (cons sink node-list))
      (putvalue node 'label nil))
    ;;********** labeling and scanning
    (do ((unscanned-nodes (tconc (cons nil nil) source)))
        ((null (cdr unscanned-nodes))
         ;;********** returns NIL when augmenting path was not found !!
         nil)
      (let ((node (remove-head unscanned-nodes)))
        (if (descendant? 'geometric-constraint node)
            (setq labeled-nodes
                  (scan-geometric-constraint node unscanned-nodes labeled-nodes))
          (setq labeled-nodes ;;;;-------------------------------------------------------------------------
;;;; Find the strong components in a geometry-graph. Returns an ordered list
;;;; of the strong components
;;;;-------------------------------------------------------------------------
(defun geometry-graph.compute-strong-components (graph slot facet)
  (declare (ignore slot facet))
  (let ((el-list (sends graph element-list get))
        (co-list (sends graph constraint-list get))
        i stack strong-comp-list
        current-el prev-el new-el)
    ;;******** initialization
    (dolist (el el-list)
      (putvalue el 'k 0)
      (putvalue el 'l 0)
      (putvalue el 'f nil)
      (putvalue el 'in-stack nil))
    (dolist (co co-list)
      (putvalue co 'used 0))
    (setq current-el (car el-list)
          el-list (cdr el-list)
          i 1
          stack (list current-el))
    (sends current-el k put 1)
    (sends current-el l put 1)
    (sends current-el in-stack put t)
    ;;********** iteration
    (do ((co (get-el-unused-co current-el)
             (get-el-unused-co current-el)))
        (nil)
      ;;********** step 7 from algorithm in Even (page 65)
      (cond ((null co)
             (when (= (sends current-el k) (sends current-el l))
               (do ((rem-stack  (cdr stack) (cdr rem-stack))
                    (el         (car stack) (car rem-stack))
                    (strong-comp nil        (cons el strong-comp)))
                   ((eq el current-el)
                    (sends el in-stack put nil)
                    (setq stack rem-stack)
                    (push el strong-comp)
                    (push strong-comp strong-comp-list))
                 (sends el in-stack put nil)))
             (cond ((setq prev-el (sends current-el f get))
                    (sends prev-el l put (min (sends prev-el l)
                                              (sends current-el l)))
                    (setq current-el prev-el))
                   (t
                    ;;********** Look for any remaining unvisited element
                    (multiple-value-setq (current-el el-list)
                      (get-unvisited-el el-list))
                    (cond (current-el
                           (setq i (+ i 1))
                           (push current-el stack)
                           (sends current-el k put i)
```

```
                          (sends current-el 1 put i)
                          (sends current-el in-stack put t))
                         (t
                          ;;********** all the elements have been visited
                          ;;********** returns the list of strong components
                          (return
                            (sends graph strong-components put
                                   strong-comp-list)))))))
                (t
                  (setq new-el (get-constrained-el co current-el))
                  (cond ((= 0 (sends new-el k))
                         (el-bwd-link-min-flow
                           flow-balance current-flow delta))))
                  (sends in-node label put (list -1 in-link element min-flow))
                  (push in-node labeled-nodes)
                  (tconc unscanned-nodes in-node)))))))
  labeled-nodes)

;;;;========================================================================
;;;; After the constraints and elements have been matched, the in-, out-,
;;;; and nd-constraints slots of the elements; and the role facets of the
;;;; constraints essential slots are set accordingly.
;;;;========================================================================
(defun geometry-graph.assign-causality (graph slot facet)
  (declare (ignore slot facet))
  ;;********** First resets the in-, out-constraint slots of the elements
  (dolist (el (sends graph element-list get))
    (dolist (co (value? (sends el out-constraints)))
      ;;********** Only binary-directed constraints are left
      (unless (eq (sends co type) 'binary-directed)
        (removevalue el 'out-constraints co)))
    (dolist (co (value? (sends el in-constraints)))
      ;;********** Only unary and binary-directed constraints are left
      (unless (or (eq (sends co type) 'unary)
                  (eq (sends co type) 'binary-directed))
        (removevalue el 'in-constraints co))))
  ;;********** goes through each constraint assigning causality
  (let (link-list index link1 link2 el1 el2 ess-slts slt1 slt2)
    (dolist (c (sends graph constraint-list get))
      (setq link-list (sends c out-links)
            index 0
            link1 (car link-list)
            link2 (cadr link-list))
      ;;**********
      ;; when constraint is unary or binary-directed (link2 = NIL),
      ;; the roles have been added at creation time
      ;;**********
      (when link2
        (setq el1 (link-to-node link1)
              el2 (link-to-node link2)
              ess-slts (sends c essential-slots))
        (if (same-object el1 (sendslot c (car ess-slts) get))
            (setq slt1 (car ess-slts)
                  slt2 (cadr ess-slts))
            (setq slt1 (cadr ess-slts)
                  slt2 (car ess-slts)))
        (when (positive-flow? (link-current-flow link1))
          (addvalue el1 'in-constraints c)
          (addvalue el2 'out-constraints c)
          (setq index 1))
        (when (positive-flow? (link-current-flow link2))
          (addvalue el2 'in-constraints c)
          (addvalue el1 'out-constraints c)
          (setq index (+ 2 index)))
        (case index
          (1 (putfacet c slt1 'role 'out)
             (putfacet c slt2 'role 'in))
          (2 (putfacet c slt1 'role 'in)
             (putfacet c slt2 'role 'out))
          ;; if neither, roles remain unspecified
          (3 (putvalue c 'bidir t)))
        )))
    ;;********** returns the graph
    graph)
      (hg.message "Subsystem is overconstrained. No solution")))
)))))
                         (sends new-el f put current-el)
                         (setq current-el new-el
                               i (+ 1 i))
                         (push current-el stack)
                         (sends current-el k put i)
                         (sends current-el 1 put i)
                         (sends current-el in-stack put t))
                        ((and (< (sends new-el k) (sends current-el k))
                              (sends new-el in-stack))
```

```
                              (sends current-el 1 put (min (sends current-el 1 get)
                                                           (sends new-el k
                                                                  get)))))))))

(defun get-el-unused-co (el)
  (dolist (co (value? (sends el out-constraints)))
    (case (sends co used)
      (0 (sends co used put 1)
         (return co))
      (1 (when (send? co bidir)
           (sends co used put 2)
           (return co))))))

(defun get-constrained-el (co current-el)
  (if (send? co bidir)
      (car (remove current-el (sends co essential-elements)
                   :test #'same-object :count 1))
      (sends co out-element)))

(defun get-unvisited-el (el-list)
  (do ((rem-els (cdr el-list) (cdr rem-els))
       (el      (car el-list) (car rem-els)))
      ((null el) nil)
    (if (= (sends el k) 0)
        (return (values el rem-els)))))

;;;;------------------------------------------------------------------------
;;;; When the strong components have been identified they are updated
;;;; sequentially.  NOTE: This is a very preliminary function.
;;;;------------------------------------------------------------------------
(defun update-strong-components (str-comp-list)
  (dolist (str-comp str-comp-list)
    (cond ((null (cdr str-comp))
           (sends (car str-comp) update))
          (t
           (let (slt-ptr-list geo-co-list alg-co-list n1 n2)
             (dolist (el str-comp)
               (setq slt-ptr-list (append (get-hg-element-slot-pointers el)
                                          slt-ptr-list))
               (dolist (co (sends el in-constraints))
                 ;;********** The check is necessary because of the
                 ;;********** possibility of bi-directional constraints.
                 (unless (member co geo-co-list :test 'same-object)
                   (push co geo-co-list)
                   (dolist (algco (sends co algebraic-constraints))
                     (push algco alg-co-list)))))
             (setq n1 (length slt-ptr-list)
                   n2 (length alg-co-list))
             (cond ((= n1 n2)
                    (algebraic-constraint.solve-group
                      n1 alg-co-list slt-ptr-list))
                   ((> n1 n2)
                    (algebraic-constraint.solve-group-under
                      n2 alg-co-list n1 slt-ptr-list))
                   (t
     ((null rem) t)
    (if (> (car rem) 0)
        (return nil)))))

(defun decompose-flow (flow)
  (values (car flow) (cadr flow) (caddr flow)))

;;;;------------------------------------------------------------------------
;;;; Define the flow interaction functions.  These are used in the process of
;;;; searching for an augmenting path from source to sink.
;;;;------------------------------------------------------------------------

(defun el-fwd-link-potential-flow (link)
  (let ((strength (link-strength link))
        (current-flow (link-current-flow link))
        dc tc rc ds ts rs dp tp rp)
    (multiple-value-setq (dc tc rc) (decompose-flow current-flow))
    (multiple-value-setq (ds ts rs) (decompose-flow strength))
    (setq dp (- ds dc)
          tp (- ts tc)
          rp (- rs rc))
    (if (< dp 0)
        (setq tp (+ tp dp)
              dp 0))
    (if (< tp 0)
        (setq rp (+ rp tp)
              tp 0))
    (list dp tp rp)))
```

←— A

```
(defun el-fwd-link-min-flow (potential-flow delta)          ← B
  (let (dp tp rp dd td rd dm tm rm temp)
    (multiple-value-setq (dp tp rp) (decompose-flow potential-flow))
    (multiple-value-setq (dd td rd) (decompose-flow delta))
    (setq rm   (min rp rd)
          temp (- rp rm)
          tm   (min (+ tp temp) td)
          temp (+ temp (- tp tm))
          dm   (min (+ dp temp) dd))
    (list dm tm rm)))

(defun el-bwd-link-min-flow (flow-balance current-flow delta)   ← C
  (let (db tb rb dc tc rc dd td rd dm tm rm c)
    (multiple-value-setq (db tb rb) (decompose-flow flow-balance))
    (multiple-value-setq (dc tc rc) (decompose-flow current-flow))
    (multiple-value-setq (dd td rd) (decompose-flow delta))
    (setq c  (+ dc tc rc)
          rm (min rd (+ rc rb) c)
          c  (- c rm)
          rb (- rb (- rm rc))
          tm (min td (+ tc tb rb) c)
          c  (- c tm)
          tb (- tb (- tm tc))
          dm (min dd (+ dc db tb rb) c))
    (list dm tm rm)))

(defun co-fwd-link-potential-flow (link)                    ← D
  (let ((strength (link-strength link))
        (current-flow (link-current-flow link))
        dc tc rc ds ts rs dp tp rp)

;;;;--------------------------------------------------------------------
;;;;
;;;; Facilities for manipulating flow (degrees of freedom interaction) in the
;;;; graph technique for geometric constraint management
;;;;
;;;; (c) Copyright Schlumberger Technology Corp.  Unpublished work.
;;;;
;;;;--------------------------------------------------------------------

;;;;--------------------------------------------------------------------
;;;; Define useful constants
;;;;--------------------------------------------------------------------

(defvar *big-flow* '(1000000 1000000 1000000))

(defvar *null-flow* '(0 0 0))

;;;;--------------------------------------------------------------------
;;;; Define useful flow interaction functions
;;;;--------------------------------------------------------------------

(defun add-flows (&rest flows)   ;; asume there is at least one flow
  (let ((result (car flows)))
    (dolist (flow (cdr flows))
      (setq result (mapcar '+ result flow)))
    result))

(defun subtract-flows (&rest flows)   ;; asume there are at least two flows
  (let ((result (car flows)))
    (dolist (flow (cdr flows))
      (setq result (mapcar '- result flow)))
    result))

(defun greater-flow (flow1 flow2)
  (do ((rem1 flow1 (cdr rem1))
       (rem2 flow2 (cdr rem2)))
      ((null rem1) t)
    (if (<= (car rem1) (car rem2))
        (return nil))))

(defun min-flow (flow1 flow2)
  (mapcar #'min flow1 flow2))

(defun max-flow (flow1 flow2)
  (mapcar #'max flow1 flow2))
```

```
(defun positive-flow? (flow)
  (dolist (s flow)
    (if (> s 0)
        (return t))))

(defun null-flow? (flow)
  (not (positive-flow? flow)))

(defun non-positive-flow? (flow)
  (do ((rem flow (cdr rem)))
      dc tc rc dd td rd dm tm rm)
    (multiple-value-setq (dc tc rc) (decompose-flow current-flow))
    (multiple-value-setq (dd td rd) (decompose-flow delta))
    (setq dm (- dc dd)
          tm (- tc td)
          rm (- rc rd))
    (when (< dm 0)
      (cond ((> tm (- dm))
             (setq tm (+ tm dm)
                   dm 0))
            ((> tm 0)
             (setq dm (+ dm tm)
                   tm 0)))
      (setq rm (+ rm dm)
            dm 0))
    (when (< tm 0)
      (cond ((> dm (- tm))
             (setq dm (+ dm tm)
                   tm 0))
            ((> dm 0)
             (setq tm (+ tm dm)
                   dm 0)))
      (setq rm (+ rm tm)
            tm 0))
    (when (< rm 0)
      (cond ((> dm (- rm))
             (setq dm (+ dm rm)
                   rm 0))
            ((> dm 0)
             (setq rm (+ rm dm)
                   dm 0)))
      (setq tm (+ tm rm)
            rm 0))
    (setf (link-current-flow link) (list dm tm rm))))

;;;;--------------------------------------------------------------------
;;;; Other utilities to determine constraint status.  A constraint is either
;;;; satisfiable (non-overconstraining) or overconstraining.
;;;;--------------------------------------------------------------------
(defun satisfiable-constraint? (constraint)
  (null-flow? (constraint.residual-flow constraint)))

(defun constraint.residual-flow (constraint)
  (let ((residual-flow (sends constraint strength)))
    (dolist (link (value? (sends constraint out-links get)))
      (setq residual-flow (co-subtract-flows residual-flow
                                             (link-current-flow link))))
    residual-flow))

(defun co-subtract-flows (flow delta)
  (let (df tf rf dd td rd dm tm rm)
    (multiple-value-setq (df tf rf) (decompose-flow flow))
    (multiple-value-setq (dd td rd) (decompose-flow delta))
    (setq dm (- df dd)
          tm (- tf td)
          rm (- rf rd))
    (if (< rm 0)
        (setq tm (+ tm rm)
              rm 0))
    (if (< tm 0)
        (setq dm (+ dm tm)
    (multiple-value-setq (dc tc rc) (decompose-flow current-flow))
    (multiple-value-setq (ds ts rs) (decompose-flow strength))
    (setq dp (- ds dc)
          tp (- ts tc)
          rp (- rs rc))
    (if (< rp 0)
        (setq tp (+ tp rp)
              rp 0))
    (if (< tp 0)
```

```
            (setq dp (+ dp tp)
                  tp 0))
      (list dp tp rp)))

(defun co-fwd-link-min-flow (potential-flow delta)
    (let (dp tp rp dd td rd dm tm rm c)
      (multiple-value-setq (dp tp rp) (decompose-flow potential-flow))
      (multiple-value-setq (dd td rd) (decompose-flow delta))
      (setq c  (+ dd td rd)
            dm (min c dp)
            c  (- c dm)
            tm (min c tp)
            c  (- c tm)
            rm (min c rp))
      (list dm tm rm)))

;;;;--------------------------------------------------------------------
;;;; Functions used for augmenting flow through the graph links
;;;;--------------------------------------------------------------------

(defun el-fwd-link-add-flow (link delta)
    (setf (link-current-flow link) (mapcar '+ (link-current-flow link) delta)))

(defun update-element-out-flow (element)
    (let ((in-flow '(0 0 0))
          (out-link (sends element out-link)))
      (dolist (in-link (sends element in-links))
        (setq in-flow (mapcar '+ in-flow (link-current-flow in-link))))
      (setf (link-current-flow out-link) in-flow)))

(defun co-fwd-link-add-flow (link delta)
    (let ((strength (link-strength link))
          (current-flow (link-current-flow link))
          dc tc rc dd td rd ds ts rs dr tr rr)
      (multiple-value-setq (dc tc rc) (decompose-flow current-flow))
      (multiple-value-setq (dd td rd) (decompose-flow delta))
      (multiple-value-setq (ds ts rs) (decompose-flow strength))
      (setq dr (+ dc dd)
            tr (+ tc td)
            rr (+ rc rd))
      (if (> dr ds)
          (setq tr (+ tr (- dr ds))
                dr ds))
      (if (> tr ts)
          (setq rr (+ rr (- tr ts))
                tr ts))
      (setf (link-current-flow link) (list dr tr rr))))

(defun co-fwd-link-subtract-flow (link delta)
    (let ((current-flow (link-current-flow link))
              tm 0))
      (list dm tm rm)))

;;;;--------------------------------------------------------------------
;;;; This is a necessary Lisp utility
;;;;--------------------------------------------------------------------
(defun remove-head (tc)
    (cond ((null (car tc))
           'nil)
          ((null (cdar tc))
           (let ((element (caar tc)))
             (rplaca tc 'nil)
             (rplacd tc 'nil)
             element))
          (t (let ((element (caar tc)))
               (rplaca tc (cdar tc))
               element))))

;;;;--------------------------------------------------------------------
;;;; These functions are for debugging purpose only.
;;;;--------------------------------------------------------------------
(defun downstream-nodes (node)
    (mapcar #'(lambda (link)
                  (link-to-node link))
            (if (descendant? 'hg-element node)
                (list (sends node out-link))
                (value? (sends node out-links)))))
```

← E

```
(defun used-downstream-nodes (node)
  (mapcan #'(lambda (link)
              (if (positive-flow? (link-current-flow link))
                  (list (link-to-node link))))
          (if (descendant? 'hg-element node)
              (list (sends node out-link))
              (value? (sends node out-links)))))
```

| geometric constraint | strength (d t r) |
|---|---|
| 2d-point-ground-constraint | (0 2 0) |
| 2d-point-ground-x-constraint | (0 1 0) |
| 2d-point-ground-y-constraint | (0 1 0) |
| 2d-points-distance-constraint | (0 1 0) |
| 2d-points-coincident-constraint | (0 2 0) |
| 2d-points-horizontal-distance-constraint | (0 1 0) |
| 2d-points-vertical-distance-constraint | (0 1 0) |
| 2d-point-line-coincident-constraint | (0 1 0) |
| 2d-point-line-distance-constraint | (0 1 0) |
| 2d-line-horizontal-constraint | (0 0 1) |
| 2d-line-vertical-constraint | (0 0 1) |
| 2d-line-ground-slope-constraint | (0 0 1) |
| 2d-lines-angular-constraint | (0 0 1) |
| 2d-lines-perpendicular-constraint | (0 0 1) |
| 2d-lines-parallel-constraint | (0 0 1) |
| 2d-lines-distance-constraint | (0 1 1) |
| 2d-point-circle-center-coincident-constraint | (0 2 0) |
| 2d-point-circle-coincident-constraint | (1 0 0) |
| 2d-line-circle-center-coincident-constraint | (0 1 0) |
| 2d-line-circle-center-distance-constraint | (0 1 0) |
| 2d-line-circle-tangent-constraint | (1 0 0) |
| 2d-circles-concentric-constraint | (0 2 0) |
| 2d-circles-tangent-constraint | (1 0 0) |
| 2d-circles-distance-constraint | (0 1 0) |
| 2d-circle-ground-radius-constraint | (1 0 0) |

Table 1: Geometric constraints in 2D and their corresponding strength

| geometric constraint | link1 | link2 |
|---|---|---|
| 2d-point-ground-constraint | point/(0 2 0) | |
| 2d-point-ground-x-constraint | point/(0 1 0) | |
| 2d-point-ground-y-constraint | point/(0 1 0) | |
| 2d-points-distance-constraint | point1/(0 1 0) | point2/(0 1 0) |
| 2d-points-coincident-constraint | point1/(0 2 0) | point2/(0 2 0) |
| 2d-points-horizontal-distance-constraint | point1/(0 1 0) | point2/(0 1 0) |
| 2d-points-vertical-distance-constraint | point1/(0 1 0) | point2/(0 1 0) |
| 2d-point-line-coincident-constraint | point/(0 1 0) | line/(0 1 0) |
| 2d-point-line-distance-constraint | point/(0 1 0) | line/(0 1 0) |
| 2d-line-horizontal-constraint | line/(0 0 1) | |
| 2d-line-vertical-constraint | line/(0 0 1) | |
| 2d-line-ground-slope-constraint | line/(0 0 1) | |
| 2d-lines-angular-constraint | line1/(0 0 1) | line2/(0 0 1) |
| 2d-lines-perpendicular-constraint | line1/(0 0 1) | line2/(0 0 1) |
| 2d-lines-parallel-constraint | line1/(0 0 1) | line2/(0 0 1) |
| 2d-lines-distance-constraint | line1/(0 1 1) | line2/(0 1 1) |

| | | |
|---|---|---|
| 2d-point-circle-coincident-constraint | point/(0 1 0) | circle/(1 0 0) |
| 2d-line-circle-center-coincident-constraint | line/(0 1 0) | circle/(0 1 0) |
| 2d-line-circle-center-distance-constraint | line/(0 1 0) | circle/(0 1 0) |
| 2d-line-circle-tangent-constraint | line/(0 1 0) | circle/(1 0 0) |
| 2d-circles-concentric-constraint | circle1/(0 2 0) | circle2/(0 2 0) |
| 2d-circles-tangent-constraint | circle1/(1 0 0) | circle2/(1 0 0) |
| 2d-circles-distance-constraint | circle1/(0 1 0) | circle2/(0 1 0) |
| 2d-circle-ground-radius-constraint | circle/(1 0 0) | |

Table 2: Flow capacity (strength) for links connecting Geometric constraints and the affected geometric elements

| 2d-element | degrees of freedom (d t r) |
|---|---|
| 2d-point | (0 2 0) |
| 2d-line | (0 1 1) |
| 2d-circle | (1 2 0) |

Table 3: Geometric elements in 2D and their corresponding degrees of freedom

```
            (STRENGTH (VALUE 1 0 0))))

(DEFOBJECT 2D-CIRCLES-CONCENTRIC-CONSTRAINT
           ((CIRCLE1 (DOF 0 2 0))
            (CIRCLE2 (DOF 0 2 0))
            (STRENGTH (VALUE 0 2 0))))

(DEFOBJECT 2D-CIRCLES-TANGENT-CONSTRAINT
           ((CIRCLE1 (DOF 1 0 0))
            (CIRCLE2 (DOF 1 0 0))
            (STRENGTH (VALUE 1 0 0))))

(DEFOBJECT 2D-CIRCLES-DISTANCE-CONSTRAINT
           ((CIRCLE1 (DOF 0 1 0))
            (CIRCLE2 (DOF 0 1 0))
            (STRENGTH (VALUE 0 1 0))))
           ((PLANE   (DOF 0 0 1))
            (CYLINDER (DOF 0 0 1))
            (STRENGTH (VALUE 0 0 1))))

(DEFOBJECT 3D-SPHERE-CYLINDER-TANGENT-CONSTRAINT
           ((CYLINDER (DOF 1 0 0))
            (SPHERE   (DOF 1 0 0))
            (STRENGTH (VALUE 1 0 0))))

(DEFOBJECT 3D-CYLINDERS-CONCENTRIC-CONSTRAINT
           ((CYLINDER1 (DOF 0 2 2))
            (CYLINDER2 (DOF 0 2 2))
            (STRENGTH (VALUE 0 2 2))))

(DEFOBJECT 3D-CYLINDERS-TANGENT-CONSTRAINT
           ((CYLINDER1 (DOF 1 0 0))
            (CYLINDER2 (DOF 1 0 0))
            (STRENGTH (VALUE 1 0 0))))

(DEFOBJECT 3D-POINT-CIRCLE-CENTER-COINCIDENT-CONSTRAINT
           ((CIRCLE (DOF 0 3 0))
            (POINT  (DOF 0 3 0))
            (STRENGTH (VALUE 0 3 0))))

(DEFOBJECT 3D-POINT-CIRCLE-COINCIDENT-CONSTRAINT
           ((POINT  (DOF 0 2 0))
            (CIRCLE (DOF 2 0 0))
            (STRENGTH (VALUE 2 0 0))))

(DEFOBJECT 3D-LINE-CIRCLE-TANGENT-CONSTRAINT
           ((LINE   (DOF 0 2 1))
```

```
            (CIRCLE   (DOF 2 0 1))
            (STRENGTH (VALUE 2 0 1))))

(DEFOBJECT 3D-PLANE-CIRCLE-COINCIDENT-CONSTRAINT
           ((PLANE   (DOF 0 1 2))
            (CIRCLE  (DOF 0 1 2))
            (STRENGTH (VALUE 0 1 2))))

(DEFOBJECT 3D-CIRCLES-CONCENTRIC-CONSTRAINT
           ((CIRCLE1 (DOF 0 3 0))
            (CIRCLE2 (DOF 0 3 0))
            (STRENGTH (VALUE 0 3 0))))

(DEFOBJECT 3D-CIRCLES-TANGENT-CONSTRAINT
           ((CIRCLE1 (DOF 1 0 2))
            (CIRCLE2 (DOF 1 0 2))
            (STRENGTH (VALUE 1 0 2)))
           (LINE    (DOF 0 2 0))
            (STRENGTH (VALUE 0 2 0))))

(DEFOBJECT 3D-LINE-SPHERE-TANGENT-CONSTRAINT
           ((LINE    (DOF 0 1 0))
            (SPHERE  (DOF 1 0 0))
            (STRENGTH (VALUE 1 0 0))))

(DEFOBJECT 3D-PLANE-SPHERE-CENTER-COINCIDENT-CONSTRAINT
           ((SPHERE  (DOF 0 1 0))
            (PLANE   (DOF 0 1 0))
            (STRENGTH (VALUE 0 1 0))))

(DEFOBJECT 3D-PLANE-SPHERE-TANGENT-CONSTRAINT
           ((PLANE   (DOF 0 1 0))
            (SPHERE  (DOF 1 0 0))
            (STRENGTH (VALUE 0 1 0))))

(DEFOBJECT 3D-SPHERES-CONCENTRIC-CONSTRAINT
           ((SPHERE1 (DOF 0 3 0))
            (SPHERE2 (DOF 0 3 0))
            (STRENGTH (VALUE 0 3 0))))

(DEFOBJECT 3D-SPHERES-TANGENT-CONSTRAINT
           ((SPHERE1 (DOF 1 0 0))
            (SPHERE2 (DOF 1 0 0))
            (STRENGTH (VALUE 1 0 0))))

(DEFOBJECT 3D-POINT-CYLINDER-AXIS-COINCIDENT-CONSTRAINT
           ((POINT    (DOF 0 2 0))
            (CYLINDER (DOF 0 2 0))
            (STRENGTH (VALUE 0 2 0))))

(DEFOBJECT 3D-POINT-CYLINDER-COINCIDENT-CONSTRAINT
           ((POINT    (DOF 0 1 0))
            (CYLINDER (DOF 1 0 0))
            (STRENGTH (VALUE 1 0 0))))

(DEFOBJECT 3D-LINE-CYLINDER-AXIS-COINCIDENT-CONSTRAINT
           ((CYLINDER (DOF 0 2 2))
            (LINE     (DOF 0 2 2))
            (STRENGTH (VALUE 0 2 2))))

(DEFOBJECT 3D-LINE-CYLINDER-TANGENT-CONSTRAINT
           ((LINE     (DOF 0 1 0))
            (CYLINDER (DOF 1 0 0))
            (STRENGTH (VALUE 1 0 0))))

(DEFOBJECT 3D-PLANE-CYLINDER-AXIS-COINCIDENT-CONSTRAINT
           ((CYLINDER (DOF 0 1 1))
            (PLANE    (DOF 0 1 1))
            (STRENGTH (VALUE 0 1 1))))

(DEFOBJECT 3D-PLANE-CYLINDER-PERPENDICULAR-CONSTRAINT
           ((PLANE    (DOF 0 0 2))
            (CYLINDER (DOF 0 0 2))
            (STRENGTH (VALUE 0 0 2))))

(DEFOBJECT 3D-PLANE-CYLINDER-TANGENT-CONSTRAINT
           ((PLANE    (DOF 0 1 1))
            (CYLINDER (DOF 1 0 1))
            (STRENGTH (VALUE 1 0 1))))

(DEFOBJECT 3D-PLANE-CYLINDER-PARALLEL-CONSTRAINT
            (STRENGTH (VALUE 0 1 1))))

(DEFOBJECT 3D-LINE-PLANE-ANGLE-CONSTRAINT
```

```
           ((LINE    (DOF 0 0 1))
            (PLANE   (DOF 0 0 1))
            (ANGLE)
            (STRENGTH (VALUE 0 0 1))))

(DEFOBJECT 3D-LINE-PLANE-PARALLEL-CONSTRAINT
           ((LINE    (DOF 0 0 1))
            (PLANE   (DOF 0 0 1))
            (STRENGTH (VALUE 0 0 1))))

(DEFOBJECT 3D-LINE-PLANE-PERPENDICULAR-CONSTRAINT
           ((LINE    (DOF 0 0 2))
            (PLANE   (DOF 0 0 2))
            (STRENGTH (VALUE 0 0 2))))

(DEFOBJECT 3D-PLANES-ANGULAR-CONSTRAINT
           ((PLANE1  (DOF 0 0 1))
            (PLANE2  (DOF 0 0 1))
            (ANGLE)
            (STRENGTH (VALUE 0 0 1))))

(DEFOBJECT 3D-PLANES-PERPENDICULAR-CONSTRAINT
           ((PLANE1  (DOF 0 0 1))
            (PLANE2  (DOF 0 0 1))
            (STRENGTH (VALUE 0 0 1))))

(DEFOBJECT 3D-PLANES-PARALLEL-CONSTRAINT
           ((PLANE1  (DOF 0 0 2))
            (PLANE2  (DOF 0 0 2))
            (STRENGTH (VALUE 0 0 2))))

(DEFOBJECT 3D-PLANE-PARALLEL-TO-XY-CONSTRAINT
           ((PLANE   (DOF 0 0 2))
            (STRENGTH (VALUE 0 0 2))))

(DEFOBJECT 3D-PLANE-PARALLEL-TO-YZ-CONSTRAINT
           ((PLANE   (DOF 0 0 2))
            (STRENGTH (VALUE 0 0 2))))

(DEFOBJECT 3D-PLANE-PARALLEL-TO-ZX-CONSTRAINT
           ((PLANE   (DOF 0 0 2))
            (STRENGTH (VALUE 0 0 2))))

(DEFOBJECT 3D-PLANES-DISTANCE-CONSTRAINT
           ((PLANE1  (DOF 0 1 2))
            (PLANE2  (DOF 0 1 2))
            (DISTANCE)
            (STRENGTH (VALUE 0 1 2))))

(DEFOBJECT 3D-POINT-SPHERE-CENTER-COINCIDENT-CONSTRAINT
           ((SPHERE  (DOF 0 3 0))
            (POINT   (DOF 0 3 0))
            (STRENGTH (VALUE 0 3 0))))

(DEFOBJECT 3D-POINT-SPHERE-COINCIDENT-CONSTRAINT
           ((POINT   (DOF 0 1 0))
            (SPHERE  (DOF 1 0 0))
            (STRENGTH (VALUE 1 0 0))))

(DEFOBJECT 3D-LINE-SPHERE-CENTER-COINCIDENT-CONSTRAINT
           ((SPHERE  (DOF 0 2 0))

(DEFOBJECT 3D-LINES-COINCIDENT-CONSTRAINT
           ((LINE1   (DOF 0 2 2))
            (LINE2   (DOF 0 2 2))
            (STRENGTH (VALUE 0 2 2))))

(DEFOBJECT 3D-LINES-ANGULAR-CONSTRAINT
           ((LINE1   (DOF 0 0 1))
            (LINE2   (DOF 0 0 1))
            (ANGLE)
            (STRENGTH (VALUE 0 0 1))))

(DEFOBJECT 3D-LINES-PERPENDICULAR-CONSTRAINT
           ((LINE1   (DOF 0 0 1))
            (LINE2   (DOF 0 0 1))
            (STRENGTH (VALUE 0 0 1))))

(DEFOBJECT 3D-LINES-PARALLEL-CONSTRAINT
           ((LINE1   (DOF 0 0 2))
            (LINE2   (DOF 0 0 2))
            (STRENGTH (VALUE 0 0 2))))

(DEFOBJECT 3D-LINE-PARALLEL-TO-X-CONSTRAINT
```

```
          ((LINE    (DOF 0 0 2))
           (STRENGTH (VALUE 0 0 2))))

(DEFOBJECT 3D-LINE-PARALLEL-TO-Y-CONSTRAINT
          ((LINE    (DOF 0 0 2))
           (STRENGTH (VALUE 0 0 2))))

(DEFOBJECT 3D-LINE-PARALLEL-TO-Z-CONSTRAINT
          ((LINE    (DOF 0 0 2))
           (STRENGTH (VALUE 0 0 2))))

(DEFOBJECT 3D-LINES-DISTANCE-CONSTRAINT
          ((LINE1   (DOF 0 1 0))
           (LINE2   (DOF 0 1 0))
           (DISTANCE)
           (STRENGTH (VALUE 0 1 0))))

(DEFOBJECT 3D-LINES-CROSSING-CONSTRAINT
          ((LINE1   (DOF 0 1 0))
           (LINE2   (DOF 0 1 0))
           (STRENGTH (VALUE 0 1 0))))

(DEFOBJECT 3D-POINT-PLANE-COINCIDENT-CONSTRAINT
          ((POINT   (DOF 0 1 0))
           (PLANE   (DOF 0 1 0))
           (STRENGTH (VALUE 0 1 0))))

(DEFOBJECT 3D-POINT-PLANE-DISTANCE-CONSTRAINT
          ((POINT   (DOF 0 1 0))
           (PLANE   (DOF 0 1 0))
           (DISTANCE)
           (STRENGTH (VALUE 0 1 0))))

(DEFOBJECT 3D-LINE-PLANE-COINCIDENT-CONSTRAINT
          ((LINE    (DOF 0 1 1))
           (PLANE   (DOF 0 1 1))
           (STRENGTH (VALUE 0 1 1))))

(DEFOBJECT 3D-LINE-PLANE-DISTANCE-CONSTRAINT
          ((LINE    (DOF 0 1 1))
           (PLANE   (DOF 0 1 1))
           (DISTANCE)

;;;;----------------------------------------
;;;;
;;;; Summary of geometric constraints in 3D.
;;;;
;;;; (c) Copyright Schlumberger Technology Corp.  Unpublished work.
;;;;
;;;;----------------------------------------

(DEFOBJECT 3D-POINT-GROUND-CONSTRAINT
          ((POINT   (DOF 0 3 0))
           (STRENGTH (VALUE 0 3 0))))

(DEFOBJECT 3D-POINT-GROUND-X-CONSTRAINT
          ((POINT   (DOF 0 1 0))
           (STRENGTH (VALUE 0 1 0))))

(DEFOBJECT 3D-POINT-GROUND-Y-CONSTRAINT
          ((POINT   (DOF 0 1 0))
           (STRENGTH (VALUE 0 1 0))))

(DEFOBJECT 3D-POINT-GROUND-Z-CONSTRAINT
          ((POINT   (DOF 0 1 0))
           (STRENGTH (VALUE 0 1 0))))

(DEFOBJECT 3D-POINTS-COINCIDENT-CONSTRAINT
          ((POINT1  (DOF 0 3 0))
           (POINT2  (DOF 0 3 0))
           (STRENGTH (VALUE 0 3 0))))

(DEFOBJECT 3D-POINTS-DISTANCE-CONSTRAINT
          ((POINT1  (DOF 0 1 0))
           (POINT2  (DOF 0 1 0))
           (DISTANCE)
           (STRENGTH (VALUE 0 1 0))))

(DEFOBJECT 3D-POINTS-X-DISTANCE-CONSTRAINT
          ((POINT1  (DOF 0 1 0))
           (POINT2  (DOF 0 1 0))
           (DISTANCE)
           (STRENGTH (VALUE 0 1 0))))

(DEFOBJECT 3D-POINTS-Y-DISTANCE-CONSTRAINT
```

```
          ((POINT1 (DOF 0 1 0))
           (POINT2 (DOF 0 1 0))
           (DISTANCE)
           (STRENGTH (VALUE 0 1 0))))

(DEFOBJECT 3D-POINTS-Z-DISTANCE-CONSTRAINT
          ((POINT1 (DOF 0 1 0))
           (POINT2 (DOF 0 1 0))
           (DISTANCE)
           (STRENGTH (VALUE 0 1 0))))

(DEFOBJECT 3D-POINT-LINE-COINCIDENT-CONSTRAINT
          ((POINT (DOF 0 2 0))
           (LINE  (DOF 0 2 0))
           (STRENGTH (VALUE 0 2 0))))

(DEFOBJECT 3D-POINT-LINE-DISTANCE-CONSTRAINT
          ((POINT (DOF 0 1 0))
           (LINE  (DOF 0 1 0))
           (DISTANCE)
           (STRENGTH (VALUE 0 1 0))))

(DEFOBJECT 2D-POINT-LINE-DISTANCE-CONSTRAINT
          ((POINT (DOF 0 1 0))
           (LINE (DOF 0 1 0))
           (DISTANCE)
           (STRENGTH (VALUE 0 1 0))))

(DEFOBJECT 2D-LINES-ANGULAR-CONSTRAINT
          ((LINE1 (DOF 0 0 1))
           (LINE2 (DOF 0 0 1))
           (ANGLE)
           (STRENGTH (VALUE 0 0 1))))

(DEFOBJECT 2D-LINES-PERPENDICULAR-CONSTRAINT
          ((LINE1 (DOF 0 0 1))
           (LINE2 (DOF 0 0 1))
           (STRENGTH (VALUE 0 0 1))))

(DEFOBJECT 2D-LINES-PARALLEL-CONSTRAINT
          ((LINE1 (DOF 0 0 1))
           (LINE2 (DOF 0 0 1))
           (STRENGTH (VALUE 0 0 1))))

(DEFOBJECT 2D-LINES-DISTANCE-CONSTRAINT
          ((LINE1 (DOF 0 1 1))
           (LINE2 (DOF 0 1 1))
           (DISTANCE)
           (STRENGTH (VALUE 0 1 1))))

(DEFOBJECT 2D-CIRCLE-GROUND-CONSTRAINT
          ((CIRCLE (DOF 1 2 0))
           (STRENGTH (VALUE 1 2 0))))

(DEFOBJECT 2D-CIRCLE-GROUND-CENTER-CONSTRAINT
          ((CIRCLE (DOF 0 2 0))
           (STRENGTH (VALUE 0 2 0))))

(DEFOBJECT 2D-CIRCLE-GROUND-RADIUS-CONSTRAINT
          ((CIRCLE (DOF 1 0 0))
           (STRENGTH (VALUE 1 0 0))))

(DEFOBJECT 2D-POINT-CIRCLE-CENTER-COINCIDENT-CONSTRAINT
          ((POINT (DOF 0 2 0))
           (CIRCLE (DOF 0 2 0))
           (STRENGTH (VALUE 0 2 0))))

(DEFOBJECT 2D-POINT-CIRCLE-COINCIDENT-CONSTRAINT
          ((POINT (DOF 0 1 0))
           (CIRCLE (DOF 1 0 0))
           (STRENGTH (VALUE 1 0 0))))

(DEFOBJECT 2D-LINE-CIRCLE-CENTER-COINCIDENT-CONSTRAINT
          ((CIRCLE (DOF 0 1 0))
           (LINE (DOF 0 1 0))
           (STRENGTH (VALUE 0 1 0))))

(DEFOBJECT 2D-LINE-CIRCLE-CENTER-DISTANCE-CONSTRAINT
          ((CIRCLE (DOF 0 1 0))
           (LINE (DOF 0 1 0))
           (STRENGTH (VALUE 0 1 0))))

(DEFOBJECT 2D-LINE-CIRCLE-TANGENT-CONSTRAINT
          ((CIRCLE (DOF 1 0 0))
           (LINE (DOF 0 1 0))
```

```
;;;;
;;;;
;;;; Summary of geometric constraints in 2D.
;;;;
;;;; (c) Copyright Schlumberger Technology Corp.  Unpublished work.
;;;;
;;;;

(DEFOBJECT 2D-POINT-GROUND-CONSTRAINT
          ((POINT (DOF 0 2 0))
           (STRENGTH (VALUE 0 2 0))))

(DEFOBJECT 2D-POINT-GROUND-X-CONSTRAINT
          ((POINT (DOF 0 1 0))
           (STRENGTH (VALUE 0 1 0))))

(DEFOBJECT 2D-POINT-GROUND-Y-CONSTRAINT
          ((POINT (DOF 0 1 0))
           (STRENGTH (VALUE 0 1 0))))

(DEFOBJECT 2D-POINTS-DISTANCE-CONSTRAINT
          ((POINT1 (DOF 0 1 0))
           (POINT2 (DOF 0 1 0))
           (DISTANCE)
           (STRENGTH (VALUE 0 1 0))))

(DEFOBJECT 2D-POINTS-COINCIDENT-CONSTRAINT
          ((POINT1 (DOF 0 2 0))
           (POINT2 (DOF 0 2 0))
           (DISTANCE)
           (STRENGTH (VALUE 0 2 0))))

(DEFOBJECT 2D-POINTS-HORIZONTAL-DISTANCE-CONSTRAINT
          ((POINT1 (DOF 0 1 0))
           (POINT2 (DOF 0 1 0))
           (DISTANCE)
           (STRENGTH (VALUE 0 1 0))))

(DEFOBJECT 2D-POINTS-VERTICAL-DISTANCE-CONSTRAINT
          ((POINT1 (DOF 0 1 0))
           (POINT2 (DOF 0 1 0))
           (DISTANCE)
           (STRENGTH (VALUE 0 1 0))))

(DEFOBJECT 2D-LINE-GROUND-CONSTRAINT
          ((LINE (DOF 0 1 1))
           (STRENGTH (VALUE 0 1 1))))

(DEFOBJECT 2D-LINE-GROUND-SLOPE-CONSTRAINT
          ((LINE (DOF 0 0 1))
           (STRENGTH (VALUE 0 0 1))))

(DEFOBJECT 2D-LINE-HORIZONTAL-CONSTRAINT
          ((LINE (DOF 0 0 1))
           (STRENGTH (VALUE 0 0 1))))

(DEFOBJECT 2D-LINE-VERTICAL-CONSTRAINT
          ((LINE (DOF 0 0 1))
           (STRENGTH (VALUE 0 0 1))))

(DEFOBJECT 2D-POINT-LINE-COINCIDENT-CONSTRAINT
          ((POINT (DOF 0 1 0))
           (LINE (DOF 0 1 0))
           (STRENGTH (VALUE 0 1 0))))
```

I claim:

1. A computer-aided modeling method for representing a network having geometric entities and configuration constraints comprising the steps of:
   representing the entities and constraints as nodes in a directed graph;
   allocating degrees of freedom to each entity and each constraint including a maximal flow configuration of said directed graph of said degrees of freedom from the constraint nodes through the entity nodes to a sink node;
   generating an ordered dependency list of the geometric entities using said maximal flow configuration; and
   utilizing the dependency list as an execution sequence for updating the configuration of the geometric entities in the network.

2. The method of claim 1, the allocating step including the substep of assigning a constraint dependency to the entity nodes based on the maximal flow configuration.

3. The method of claim 2, the generating step including the substep of creating a second directed graph with the geometric entities as nodes and the constraints as links between the nodes directed according to the assigned constraint dependency.

4. The method of claim 1, the utilizing step including the substep of updating the configuration of a single geometric entity in said network using constructive geometry techniques if the value of a constraint affecting the single geometric element is changed.

5. The method of claim 1, the utilizing step including the substep of updating the configuration of two or more geometric entities using algebraic equation problem solving techniques if the value of a constraint affecting said two or more geometric entities is changed.

6. The method of claim 1, the utilizing step including the substeps of repeating the representing, allocating, and generating steps if an entity or constraint is added or deleted from the network.

7. The method of claim 1, including the steps of displaying the current network model and indicating on the display if the current network is under constrained or a display is not feasible because the proposed network is over constrained.

8. The method of claim 2, said maximal flow configuration of said directed graph being a configuration in which the maximal flow of degrees of freedom from said constraint nodes through said entity nodes to said sink node occurs.

9. The method of claim 8, the links between the constraint nodes and entity nodes being assigned a flow capacity equal to the number of degrees of freedom of the geometric entity affected by the constraint.

10. The method of claim 9, each link between an entity node and the sink node being assigned a flow capacity equal to the degrees of freedom of the geometric entity represented by the entity node.

11. The method of claim 1, the utilizing step including the substep of updating the configuration of a single geometric entity in said network using constructive geometry techniques if the configuration of a second geometric entity on which said single entity depends is changed.

12. In a computer aided geometric modeling system a method for assigned dependencies to geometric entities in a network having geometric constraints between entities, comprising the steps of:
representing the entities and constraints as a directed graph with the constraints as source nodes of degrees of freedom, the entities as intermediate nodes in the graph and a sink node;
assigning a flow capacity to each constraint node;
linking each constraint node to the entity nodes affected by said respective constraint;
assigning a flow capacity to the links between the nodes; linking each entity node to a sink node;
determining a maximal flow configuration through the directed graph from the constraint nodes through the entity nodes to the sink node;
assigning constraint dependencies to the entity nodes according to the maximal flow configuration;
creating a second directed graph with the geometric entities as nodes and the constraints as links between the nodes directed according to the assigned constraint dependency; and
determining the strong components of the second directed graph and lifting the components as an order dependency list.

13. The method of claim 12, including the step of utilizing the ordered dependency list as an execution sequence for updating the configuration of the geometric entities in the network.

14. The method of claim 13, including the step of displaying the geometric entities for the current values of constraints.

15. The method of claim 13, the utilizing step including the substeps of using algebraic equation problem solving techniques if a components comprises two or more geometric entities to find possible configurations of the entities and displaying the geometric entities.

16. The method of claim 12, including the step of indicting from the computer system if a display of geometric entities is under constrained.

17. The method of claim 12, including the step of indicating from the computer system if a valid display of the network of geometric entities is not possible because the network is over constrained.

18. The method of claim 12, including repeating the steps if a geometric entity or constraint is added or deleted from the network.

19. A geometric modeling system for modeling a network of geometric entities whose configurations are constrained, comprising:
a computer having
means for representing the network as a directed graph of constraint nodes, entity nodes, and a sink node linked to all of the entity nodes,
means for determining a maximal flow through the directed graph and for determined an ordered dependency list of entities; and
means for displaying the network of geometric entities using the orderd dependency list as an execution sequence for visualizing changes to the network if a constraint or entity is changed.

20. The method of claim 19, including means for changing the network by manipulating the geometric entities on the display means.

21. The method of claim 20, the changing means comprising a mouse.

22. The method of claim 19, said determining means being operable for representing a second directed graph with the entities as nodes and the constraints as directed links utilizing the maximal flow to allocate constraint dependencies.

23. The method of claim 19, said display means being operable for displaying a possible configuration of the geometric entities if the network is under constrained and operable for indicating an under constrained condition exists.

* * * * *